United States Patent
Ishiyama et al.

(10) Patent No.: US 8,472,704 B2
(45) Date of Patent: Jun. 25, 2013

(54) IMAGE PROCESSING APPARATUS AND IMAGE PROCESSING METHOD

(75) Inventors: Eiji Ishiyama, Saitama (JP); Atsushi Misawa, Saitama (JP); Koichi Yahagi, Saitama (JP); Yitong Zhang, Saitama (JP); Hisashi Endo, Saitama (JP); Koichi Tanaka, Saitama (JP); Takeshi Okubo, Saitama (JP); Mikio Watanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/504,883

(22) PCT Filed: Oct. 14, 2010

(86) PCT No.: PCT/JP2010/068039
§ 371 (c)(1),
(2), (4) Date: Apr. 27, 2012

(87) PCT Pub. No.: WO2011/052389
PCT Pub. Date: May 5, 2011

(65) Prior Publication Data
US 2012/0219208 A1    Aug. 30, 2012

(30) Foreign Application Priority Data
Oct. 30, 2009    (JP) .................. 2009-250922

(51) Int. Cl.
*G06K 9/00*    (2006.01)
(52) U.S. Cl.
USPC ............... 382/154; 348/47; 348/50; 348/51; 382/276; 396/104

(58) Field of Classification Search
USPC .... 348/47, 48, 50, 51; 382/154, 276; 396/104
See application file for complete search history.

(56) References Cited

U.S. PATENT DOCUMENTS
5,926,294 A * 7/1999 Sato et al. ............... 359/22
(Continued)

FOREIGN PATENT DOCUMENTS
| JP | 8-331607 A | 12/1996 |
| JP | 2003-209858 A | 7/2003 |
| JP | 2007-336002 A | 12/2007 |

*Primary Examiner* — Gregory M Desire
(74) *Attorney, Agent, or Firm* — Birch, Stewart, Kolasch & Birch, LLP

(57) ABSTRACT

An image processing apparatus that an image input unit; a parallax acquisition unit configured to acquire a per-pixel or per-region parallax between two-viewpoint images; a main subject detection unit configured to detect a main subject on the two-viewpoint images; a parallax acquisition unit configured to acquire a parallax of the main subject; a setting unit configured to set a conversion factor of the parallax; a correction unit configured to correct the conversion factor of the parallax per pixel, per region, or per image; a multi-viewpoint image generation unit configured to convert at least one image of the two-viewpoint images in accordance with the corrected conversion factor of the parallax; an image adjustment unit configured to shift the two-viewpoint images or multi-viewpoint images to obtain a parallax appropriate for stereoscopic view; and a stereoscopically-displayed image generation unit configured to generate a stereoscopically-displayed image.

17 Claims, 17 Drawing Sheets

U.S. PATENT DOCUMENTS

| | | | |
|---|---|---|---|
| 6,118,475 A * | 9/2000 | Iijima et al. | 348/42 |
| 6,384,859 B1 | 5/2002 | Matsumoto et al. | |
| 7,239,351 B2 * | 7/2007 | Kunishige et al. | 348/333.09 |
| 2002/0113867 A1 * | 8/2002 | Takigawa et al. | 348/51 |
| 2003/0026474 A1 * | 2/2003 | Yano | 382/154 |
| 2003/0067638 A1 * | 4/2003 | Yano | 358/540 |
| 2004/0247175 A1 * | 12/2004 | Takano et al. | 382/154 |
| 2009/0244265 A1 * | 10/2009 | Ishiyama et al. | 348/50 |
| 2010/0321388 A1 * | 12/2010 | Daly et al. | 345/427 |

* cited by examiner

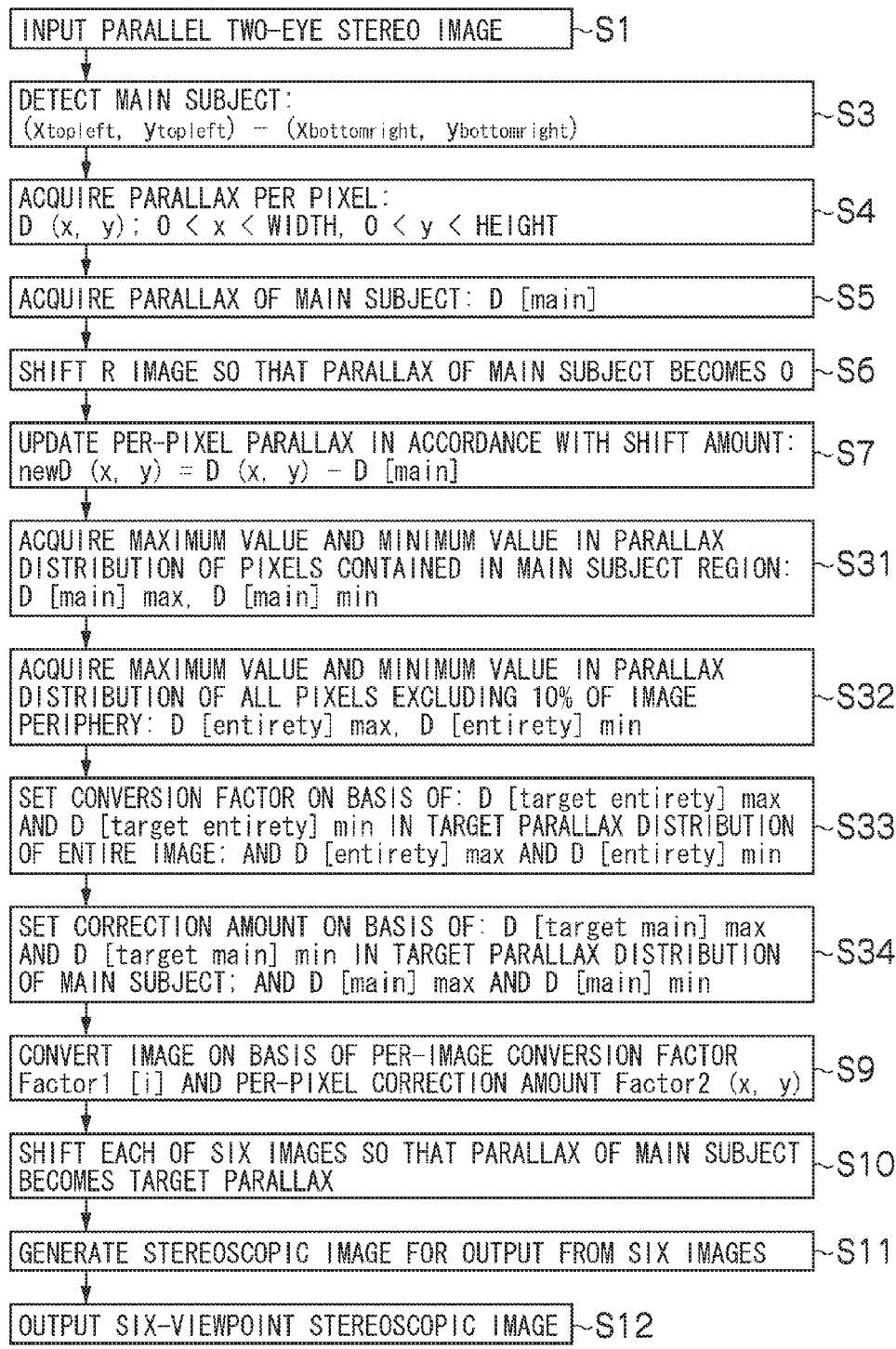

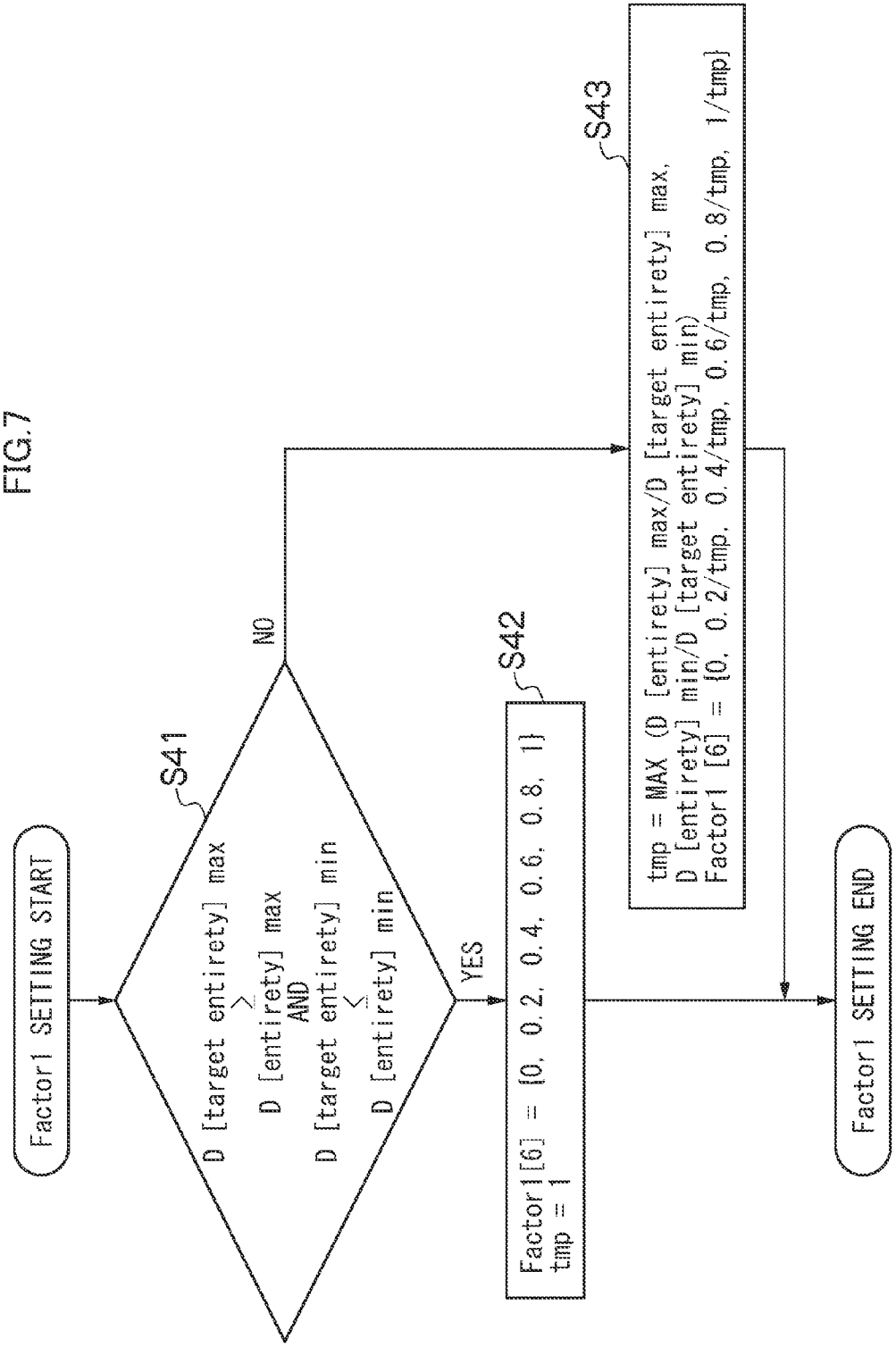

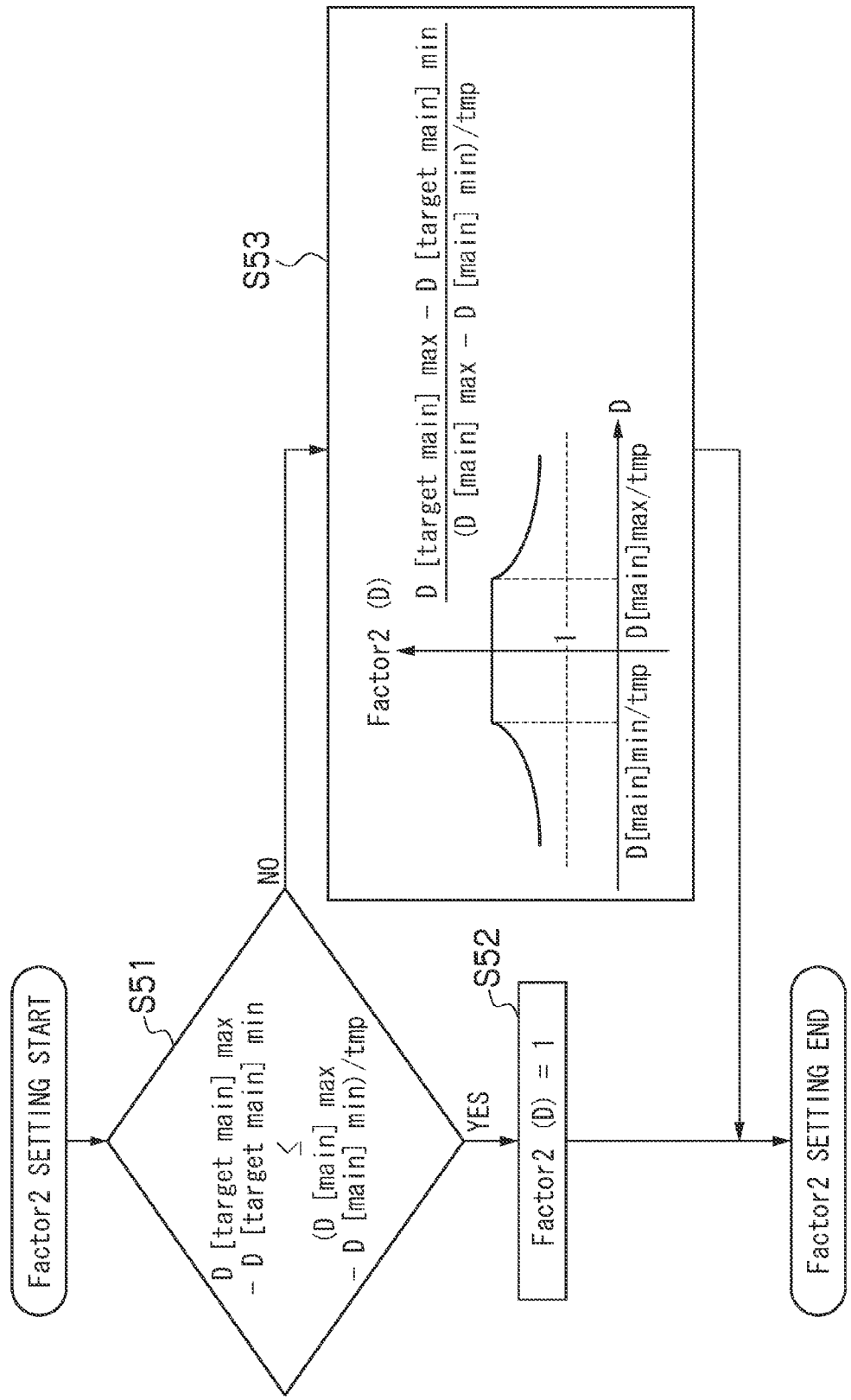

IMAGE PROCESSING APPARATUS AND IMAGE PROCESSING METHOD

TECHNICAL FIELD

The present invention relates to an image processing apparatus and an image processing method, and more particularly, to an image processing apparatus and an image processing method which generate multi-viewpoint images from inputted two-viewpoint images.

BACKGROUND ART

A technology of generating an image corresponding to an arbitrary intermediate viewpoint from two images which have viewpoints different from each other and are photographed as a stereo image is important to display an appropriate stereoscopic image on a stereoscopic photographic print having a surface on which a lenticular lens sheet is attached or various other stereoscopic image display devices.

PTL 1 describes a technology in which a depth or an increase in parallax between both eyes is linearly compressed with respect to an arbitrary point as the center, and a desired depth effect can be accordingly obtained through simple conversion. According to this technology, a depth effect in a predetermined region of a three-dimensionally displayed image to be generated can be changed, which thus enables a flexible response to a preference of a viewer and the like.

CITATION LIST

Patent Literature

{PTL 1} Japanese Patent Application Laid-Open No. 08-331607

SUMMARY OF INVENTION

Technical Problem

However, according to the invention described in PTL 1, since control on a target value of a stereoscopic effect of a main subject is not performed, in the case where a process of suppressing a parallax is performed on an image which cannot be stereoscopically viewed due to an excessively large parallax, there arises a disadvantage as an adverse effect that parallax distribution of the main subject becomes excessively small, so that the stereoscopic effect may be lost.

The present invention has been made in view of the above-mentioned circumstances, and therefore has an object to provide an image processing apparatus and an image processing method which generate multi-viewpoint images in which a parallax of an entire image is suppressed to be small enough to enable stereoscopic view while a stereoscopic effect of a main subject is maintained.

Solution to Problem

In order to achieve the above-mentioned object, an image processing apparatus according to a first aspect of the present invention includes: an image input unit configured to receive two-viewpoint images having a parallax therebetween; a parallax acquisition unit configured to acquire a per-pixel or per-region parallax between the two-viewpoint images; a main subject detection unit configured to detect a main subject on the two-viewpoint images; a parallax acquisition unit configured to acquire a parallax of the main subject; a setting unit configured to set a conversion factor of the parallax in accordance with respective viewpoint positions of multi-viewpoint images to be generated; a correction unit configured to correct the conversion factor of the parallax per pixel, per region, or per image on a basis of the parallax of the main subject; a multi-viewpoint image generation unit configured to convert at least one image of the two-viewpoint images in accordance with the corrected conversion factor of the parallax, to thereby generate the multi-viewpoint images; an image adjustment unit configured to shift the two-viewpoint images or the multi-viewpoint images in a horizontal direction so that the parallax of the main subject on the multi-viewpoint images becomes a parallax appropriate for stereoscopic view; and a stereoscopically-displayed image generation unit configured to generate a stereoscopically-displayed image on a basis of the multi-viewpoint images.

According to the first aspect, the conversion factor of the parallax according to the respective viewpoint positions of the multi-viewpoint images to be generated is corrected per pixel on the basis of the parallax of the main subject, and hence it is possible to generate the multi-viewpoint images in which the parallax of the entire image is suppressed to be small enough to enable stereoscopic view while the stereoscopic effect of the main subject is maintained.

The image processing apparatus according to a second aspect of the present invention further includes, in the first aspect, a holding unit configured to hold target parallax distribution of an entire image and target parallax distribution of the main subject, wherein: the setting unit sets the conversion factor of the parallax so that parallax distribution of the entire image of the multi-viewpoint images to be generated satisfies the target parallax distribution of the entire image; and the correction unit corrects the conversion factor of the parallax per pixel, per region, or per image so that parallax distribution of the main subject on the multi-viewpoint images to be generated satisfies the target parallax distribution of the main subject.

This makes it possible to generate the multi-viewpoint images having the parallax distribution of the entire image and the parallax distribution of the main subject which are appropriate.

The image processing apparatus according to a third aspect of the present invention further includes, in the first or second aspect, an output unit configured to output the generated stereoscopically-displayed image at a predetermined size; and a modification unit configured to modify the target parallax distribution of the entire image and the target parallax distribution of the main subject in accordance with the predetermined size.

This makes it possible to generate the multi-viewpoint images having the parallax according to the output size.

In the image processing apparatus according to a fourth aspect of the present invention, the correction unit corrects the conversion factor of the parallax per pixel, per region, or per image on a basis of a difference between the per-pixel or per-region parallax and the parallax of the main subject, in the first to third aspects.

This makes it possible to generate the multi-viewpoint images having the parallax of the entire image and the parallax of the main subject which are appropriate.

In the image processing apparatus according to a fifth aspect of the present invention, the correction unit corrects the conversion factor of the parallax so that the parallax is more suppressed in a pixel or region having the larger difference between the parallaxes, in the fourth aspect.

This makes it possible to generate the multi-viewpoint images having the parallax of the entire image and the parallax of the main subject which are appropriate.

In the image processing apparatus according to a sixth aspect of the present invention, the correction unit corrects the conversion factor of the parallax so that the parallax is more increased in a pixel or region having the smaller difference between the parallaxes, in the fourth aspect.

This makes it possible to generate the multi-viewpoint images having the parallax of the entire image and the parallax of the main subject which are appropriate.

The image processing apparatus according to a seventh aspect of the present invention further includes, in the fourth aspect, a photographing mode detection unit configured to detect a photographing mode set at a time of photographing the two-viewpoint images, from collateral information of the two-viewpoint images; and a selection unit configured to select, in accordance with the detected photographing mode, whether the correction unit corrects the conversion factor of the parallax so that the parallax is more suppressed in a pixel or region having the larger difference between the parallaxes or corrects the conversion factor of the parallax so that the parallax is more increased in a pixel or region having the smaller difference between the parallaxes.

This makes it possible to generate the multi-viewpoint images having the parallax of the entire image and the parallax of the main subject which are appropriate.

The image processing apparatus according to an eighth aspect of the present invention further includes, according to the first aspect, a parallax histogram acquisition unit configured to acquire a histogram of the per-pixel or per-region parallax, wherein the correction unit corrects the conversion factor of the parallax per pixel or per region so as to make parallax gradations constant in accordance with frequencies in the histogram.

This makes it possible to generate the multi-viewpoint images having the parallax gradations which are constant.

The image processing apparatus according to a ninth aspect of the present invention further includes, in the first aspect, a photographed scene recognition unit configured to recognize a photographed scene on the two-viewpoint images; and a main subject setting unit configured to set a main subject region in accordance with the photographed scene, wherein the correction unit corrects the conversion factor of the parallax per region or per pixel in accordance with a distance on the image from the main subject region.

This makes it possible to set the main subject through simple processing, and to generate the multi-viewpoint images having the parallax of the entire image and the parallax of the main subject which are appropriate.

In the image processing apparatus according to a tenth aspect of the present invention, the photographed scene recognition unit includes a photographing mode detection unit configured to detect a photographing mode set at a time of photographing the two-viewpoint images, from collateral information of the two-viewpoint images; the main subject region setting unit sets, in a case where the detected photographing mode is a person mode, a central region of a plurality of regions obtained by vertically dividing the image, as the main subject region; and the correction unit corrects the conversion factor of the parallax per region or per pixel in accordance with a distance in the horizontal direction from the main subject region, in the ninth aspect.

This makes it possible to set the main subject through simple processing, and to generate the multi-viewpoint images having the parallax of the entire image and the parallax of the main subject which are appropriate.

In the image processing apparatus according to an eleventh aspect of the present invention, the photographed scene recognition unit includes a photographing mode detection unit which detects a photographing mode set at a time of photographing the two-viewpoint images, from collateral information of the two-viewpoint images; the main subject region setting unit sets, in a case where the detected photographing mode is a scenery mode, a central region of a plurality of regions obtained by horizontally dividing the image, as the main subject region; and the correction unit corrects the conversion factor of the parallax per region or per pixel in accordance with a distance in the vertical direction from the main subject region, according to ninth aspect.

This makes it possible to set the main subject through simple processing, and to generate the multi-viewpoint images having the parallax of the entire image and the parallax of the main subject which are appropriate.

In the image processing apparatus according to a twelfth aspect of the present invention, the photographed scene recognition unit includes an extraction unit configured to extract a short-distance view region, a middle-distance view region, and a long-distance view region from the two-viewpoint images; and the correction unit corrects the conversion factor of the parallax per region or per pixel in accordance with the respective extracted regions, in the ninth aspect.

This makes it possible to set the main subject through simple processing, and to generate the multi-viewpoint images having the parallax of the entire image and the parallax of the main subject which are appropriate.

In the image processing apparatus according to a thirteenth aspect of the present invention, the setting unit sets, in a case where the multi-viewpoint images to be generated are four or more, the conversion factor of the parallax so that a difference between viewpoint positions in a central portion is larger than a difference between viewpoint positions at both end portions, in the first to twelfth aspects.

This makes it possible to generate the multi-viewpoint images which can be viewed in various patterns.

In the image processing apparatus according to a fourteenth aspect of the present invention, the correction unit corrects the conversion factor of the parallax per pixel, per region, or per image so that the conversion factor of the parallax of one image of the two-viewpoint images becomes 0; and the multi-viewpoint image generation unit converts the image whose conversion factor of the parallax is 0, to thereby generate the multi-viewpoint images, in the first to thirteenth aspects.

This makes it possible to use an actually photographed image with regard to an image at at least one end, of the multi-viewpoint images.

In the image processing apparatus according to a fifteenth aspect of the present invention, the correction unit corrects the conversion factor of the parallax per pixel, per region, or per image so that the conversion factor of the parallax of an image at a central viewpoint position, of the multi-viewpoint images to be generated, becomes smallest, in the first to thirteenth aspects.

This makes it possible to generate the multi-viewpoint images which are natural.

In order to achieve the above-mentioned object, an image processing method according to a sixteenth aspect of the present invention includes: an image input step of receiving two-viewpoint images having a parallax therebetween; a parallax acquisition step of acquiring a per-pixel or per-region parallax between the two-viewpoint images; a main subject detection step of detecting a main subject on the two-viewpoint images; a parallax acquisition step of acquiring a parallax of the main subject; a setting step of setting a conversion factor of the parallax in accordance with respective viewpoint positions of multi-viewpoint images to be generated; a correction step of correcting the conversion factor of the parallax per pixel, per region, or per image on a basis of the parallax of the main subject; a multi-viewpoint image generation step of converting at least one image of the two-viewpoint images in accordance with the corrected conversion factor of the parallax, to thereby generate the multi-viewpoint images; an image adjustment step of shifting the two-viewpoint images or the multi-viewpoint images in a horizontal direction so that the parallax of the main subject on the multi-viewpoint images becomes a parallax appropriate for stereoscopic view; and a stereoscopic image generation step of generating a stereoscopically-displayed image on a basis of the multi-viewpoint images.

Advantageous Effects of Invention

According to the present invention, a parallax of an entire image can be suppressed to be small enough to enable stereoscopic view while a stereoscopic effect of a main subject is maintained.

BRIEF DESCRIPTION OF DRAWINGS

FIG. 6 is a flow chart illustrating a generation process for multi-viewpoint images according to a third embodiment.

FIG. 7 is a flow chart illustrating a process for setting a conversion factor Factor1 of the per-image parallax.

FIG. 9 is a flow chart illustrating the process for setting the conversion factor Factor1 of the per-image parallax.

DESCRIPTION OF EMBODIMENTS

Hereinafter, preferred embodiments of an image processing apparatus and an image processing method according to the present invention are described with reference to the attached drawings.

First Embodiment

Figure 1:
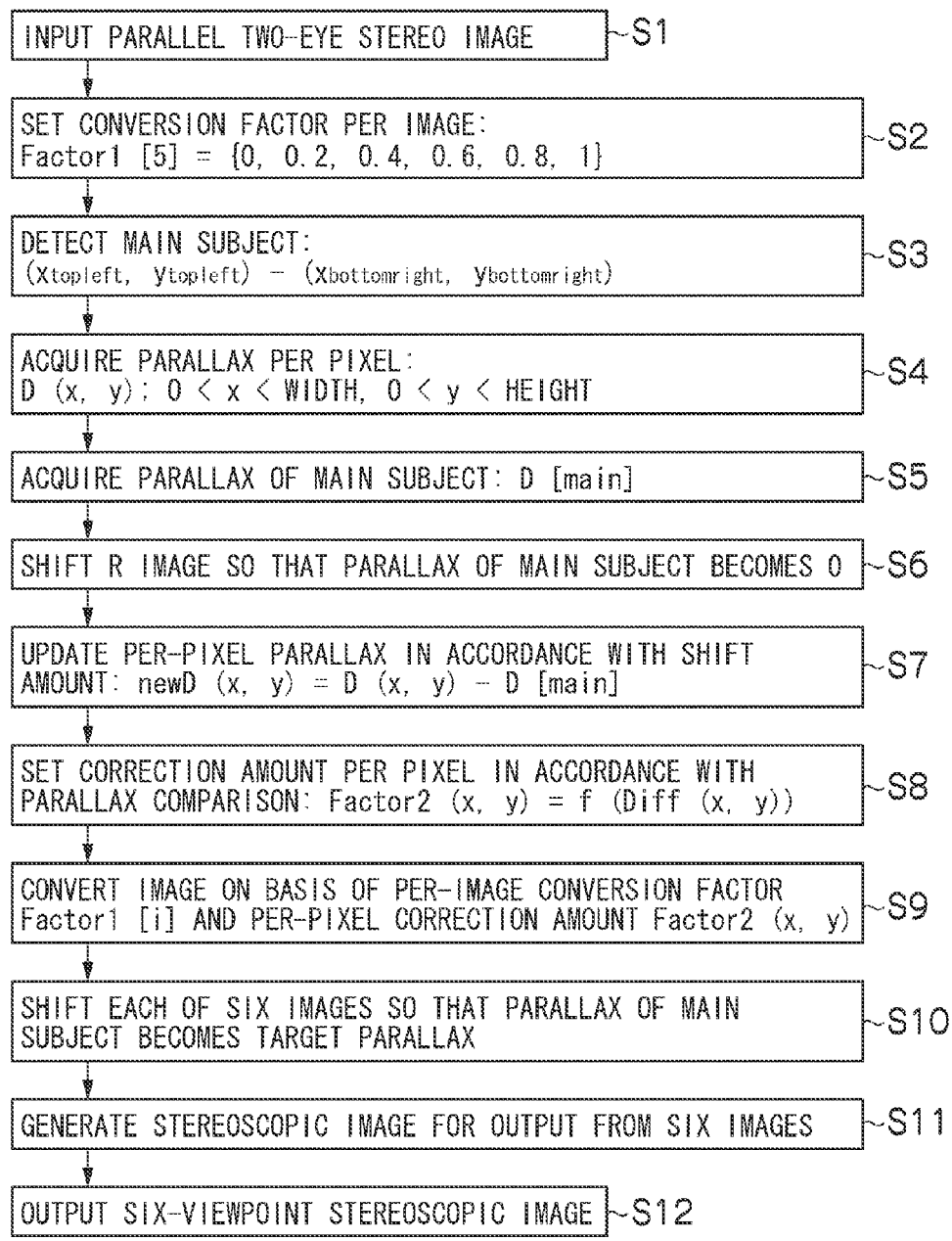
FIG. 1 is a flow chart illustrating a generation process for multi-viewpoint images according to a first embodiment.

FIG. 1 is a flow chart illustrating a generation process for multi-viewpoint images according to a first embodiment, and FIG. 2 are views each illustrating an image example for describing each process. In the present embodiment, a parallax between the multi-viewpoint images which are generated so that a main subject within the image has a suitable stereoscopic effect is controlled.

Figure 2A:
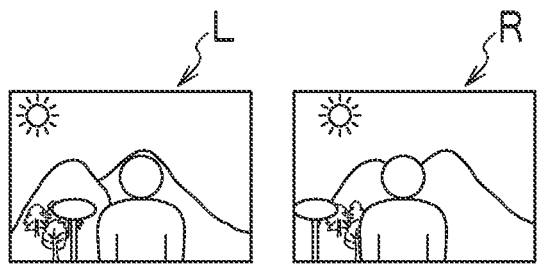
FIG. 2A is a view illustrating an example of inputted images.

First, a parallel two-eye stereo image is inputted (Step S1). The parallel two-eye stereo image refers to two images (two-viewpoint images), that is, a left viewpoint image and a right viewpoint image having viewpoints different from each other. Here, description is given by taking as an example the case where a left viewpoint image L and a right viewpoint image R illustrated in FIG. 2A are inputted.

Next, a conversion factor Factor1 of a parallax per image to be generated is set (Step S2). Here, the case where six-viewpoint images (six multi-viewpoint images) are generated from the left viewpoint image and the right viewpoint image is discussed. Conversion factors Factor1 [0] to Factor1 [5] of parallaxes of these six images are set to, for example, 0, 0.2, 0.4, 0.6, 0.8, and 1.0, respectively.

It should be noted that the number of viewpoints of multi-viewpoint images to be generated is not limited to 6, and may be decided as appropriate in accordance with an output apparatus.

Next, a main subject is detected from the left viewpoint image L, and a region of the detected main subject within the image is acquired (Step S3). Hereinafter, with the use of top left coordinates ($x_{topleft}$, $y_{topleft}$) and bottom right coordinates ($x_{bottomright}$, $y_{bottomright}$) of a rectangular region including the main subject, the region of the detected main subject within the image is described as a region ($x_{topleft}$, $y_{topleft}$)–($x_{bottomright}$, $y_{bottomright}$). It should be noted that a shape of the main subject region is not limited to a rectangle.

With regard to the main subject, for example, in the case where a person or a face of a person is detected within the image, the person or the face of the person is defined as the main subject. Alternatively, a focus position at the time of photographing is acquired from collateral information of inputted image data, and a region having a parallax according to a distance of the focus position may be defined as the main subject. Still alternatively, it is conceivable that a parallax histogram is created on the basis of parallaxes acquired per pixel, and a region having a parallax of an average value, a mode value, a median value, or the like in frequency distribution is defined as the main subject. In this case, it is preferable to create the parallax histogram with regard to, for example, a region excluding 10% of the periphery of the image. This is because the main subject can be considered not to exist in the periphery of the image.

Figure 2B:
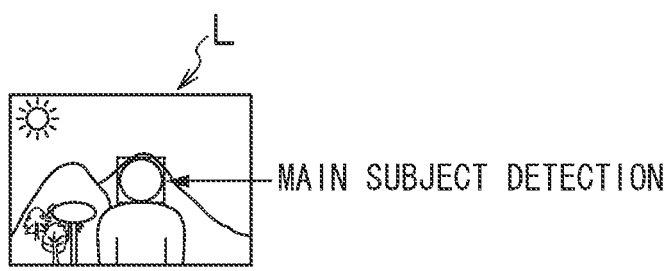
FIG. 2B is a view illustrating a main subject region.

In the example illustrated in FIG. 2B, a face of a person is detected as the main subject. In addition, a frame within the image illustrated in FIG. 2B indicates the region ($x_{topleft}$, $y_{topleft}$)–($x_{bottomright}$, $y_{bottomright}$) of the detected main subject.

Next, with reference to the left viewpoint image L, a per-pixel parallax D (x, y) to the right viewpoint image R is acquired (Step S4). The per-pixel parallax D (x, y) is acquired by calculating a correlation between the left viewpoint image L and the right viewpoint image R, to thereby detect a per-pixel corresponding point therebetween.

Figure 2C:
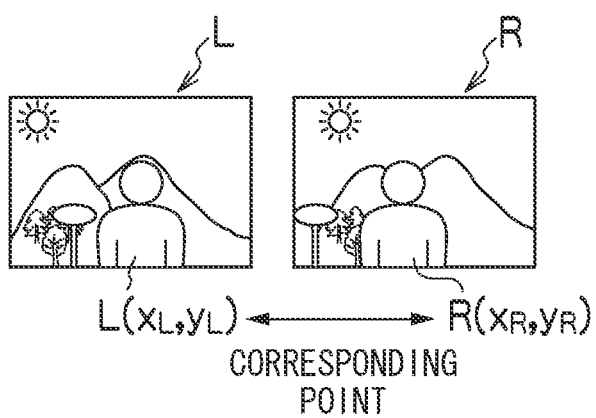
FIG. 2C is a view illustrating a correspondence relation between points on right and left viewpoint images.

FIG. 2C illustrates a point L ($x_L$, $y_L$) within the main subject on the left viewpoint image L and its corresponding point R ($x_R$, $y_R$) on the right viewpoint image R. Here, $y_L=y_R$, and the parallax at this pixel is expressed by the parallax D (x, y)=$x_R$−$x_L$.

Further, a parallax D [main] of the main subject is acquired on the basis of the per-pixel parallax D (x, y) (Step S5). The parallax D [main] of the main subject is expressed as an average value of the per-pixel parallax D (x, y) within the region ($x_{topleft}$, $y_{topleft}$)–($x_{bottomright}$, $y_{bottomright}$) of the main subject as expressed in Expression 1.

$$D[main] = \frac{\sum_{ytopleft}^{ybottomright} \sum_{xtopleft}^{xbottomright} D(x,y)}{(xbottomright - xtopleft + 1) \times (ybottomright - ytopleft + 1)}$$ [Expression 1]

Figure 2D:
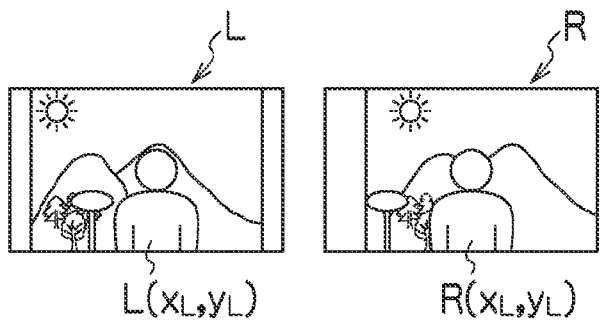
FIG. 2D is a view illustrating a left viewpoint image L and a right viewpoint image R after the right viewpoint image R is shifted.

Next, the right viewpoint image R is shifted in the horizontal direction by the parallax D [main] so that the parallax of the main subject between the left viewpoint image L and the right viewpoint image R becomes 0 (Step S6). FIG. 2D is a view illustrating the left viewpoint image L and the right viewpoint image R after the shift. Coordinates of the corresponding point R on the right viewpoint image R after the shift are ($x_L$, $y_L$).

On the basis of the parallax D [main] which is the shift amount of the right viewpoint image R, the per-pixel parallax acquired in Step S4 is updated (Step S7). That is, the per-pixel parallax after the update is expressed as newD (x, y)=D (x, y)−D [main]. This newD (x, y) corresponds to a difference diff (x, y) between the per-pixel parallax D (x, y) and the parallax of the main subject. A correction amount Factor2 of the per-pixel parallax is set in accordance with this diff (x, y) (Step S8). That is, such an expression that Factor2 (x, y)=Table (Diff (x, y)) is obtained.

Here, a function Table (x) is described.

FIG. 3A to FIG. 3D are graphs each illustrating the function Table (x) for setting the correction amount of the parallax for suppressing a stereoscopic effect in accordance with a difference to the parallax of the main subject, in each of which the horizontal axis indicates a difference Diff (x, y) to the parallax of the main subject, and the vertical axis indicates the correction amount of each parallax.

Figure 3A:
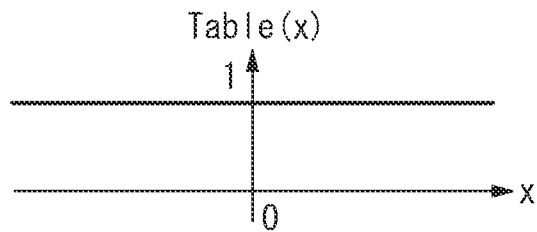
FIG. 3A is a graph illustrating a function Table (x) for setting a correction amount of a per-pixel parallax.

FIG. 3A is a graph illustrating the function Table (x) when the correction is not performed. As illustrated in this figure, in the case where the per-pixel correction is not performed, the correction amount Factor2 is always set to 1.

Figure 3B:
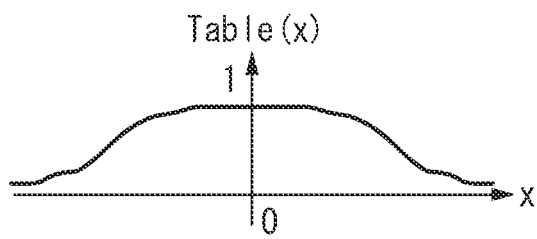
FIG. 3B is a graph illustrating the function Table (x) for setting the correction amount of the per-pixel parallax.

FIG. 3B illustrates the function Table (x) when the parallax is more suppressed (the stereoscopic effect is more suppressed) with an increase in deviation from the parallax of the main subject. The parallax at the corresponding pixel is suppressed by setting the correction amount Factor2 to a value smaller than 1 in this way.

Figure 3C:
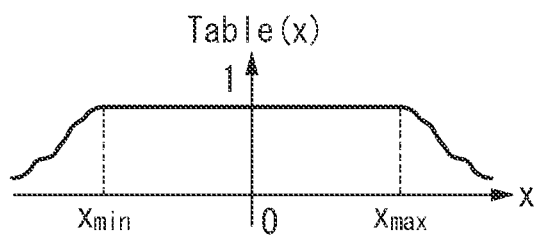
FIG. 3C is a graph illustrating the function Table (x) for setting the correction amount of the per-pixel parallax.

In addition, FIG. 3C illustrates the function Table (x) when the correction is not performed in a range of $x_{min} \leq x \leq x_{max}$ and the parallax is suppressed in a portion smaller than $x_{min}$ and a portion larger than $x_{max}$. Values of $x_{min}$ and $x_{max}$ may be decided as appropriate.

Figure 3D:
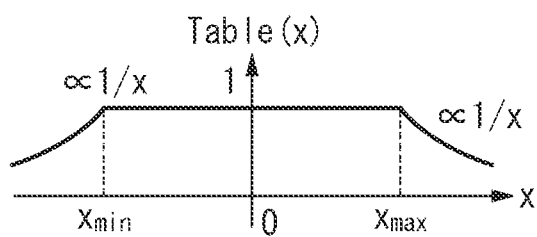
FIG. 3D is a graph illustrating the function Table (x) for setting the correction amount of the per-pixel parallax.

In addition, FIG. 3D illustrates the function Table (x) when the correction is not performed in the range of $x_{min} \leq x \leq x_{max}$ and a magnification factor of the parallax is more reduced in proportion to an increase in deviation from the parallax of the main subject in the portion smaller than $x_{min}$ and the portion larger than $x_{max}$.

As described above, the per-pixel correction amount Factor2 may be given to the per-pixel parallax by a linear or nonlinear expression, or may be given thereto by a table. In addition, here, symmetric positive and negative values are set to diff (x, y)=0, but asymmetric values may be set thereto.

In addition, FIG. 4 are graphs each illustrating the function Table (x) for setting the correction amount of the parallax for enhancing the stereoscopic effect in accordance with the difference to the parallax of the main subject.

Figure 4A:
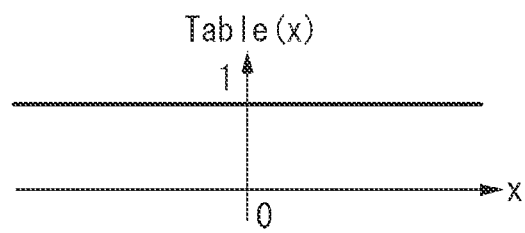
FIG. 4A is a graph illustrating the function Table (x) for setting the correction amount of the per-pixel parallax.
Figure 4B:
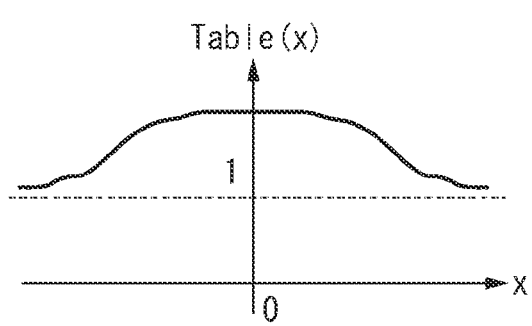
FIG. 4B is a graph illustrating the function Table (x) for setting the correction amount of the per-pixel parallax.

FIG. 4A is a graph illustrating the function Table (x) when the correction is not performed similarly to FIG. 3A, and FIG. 4B illustrates the function Table (x) when the parallax is more increased (the stereoscopic effect is more enhanced) with a decrease in deviation from the parallax of the main subject. The parallax at the corresponding pixel is increased by setting the correction amount Factor2 to a value larger than 1 in this way.

Figure 4C:
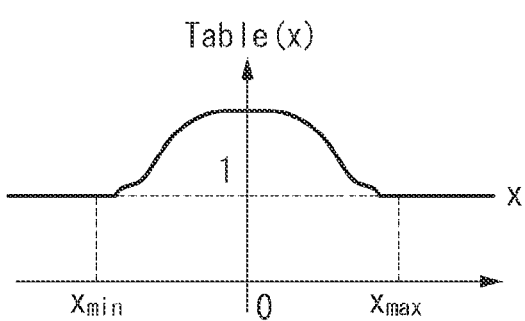
FIG. 4C is a graph illustrating the function Table (x) for setting the correction amount of the per-pixel parallax.
Figure 4D:
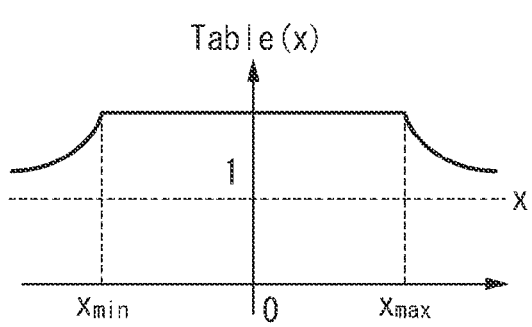
FIG. 4D is a graph illustrating the function Table (x) for setting the correction amount of the per-pixel parallax.

In addition, FIG. 4C illustrates the function Table (x) when the parallax is more increased with a decrease in deviation from the parallax of the main subject in $x_{min} \leq x \leq x_{max}$ and the correction is not performed in the portion smaller than $x_{min}$ and the portion larger than $x_{max}$, and FIG. 4D illustrates the function Table (x) when the parallax is uniformly increased in $x_{min} \leq x \leq x_{max}$ and the magnification factor of the parallax is more reduced in proportion to an increase in deviation from the parallax of the main subject in the portion smaller than $x_{min}$ and the portion larger than $x_{max}$.

As described above, the per-pixel correction amount Factor2 (x, y) may be set so as to enhance the stereoscopic effect in accordance with the difference to the parallax of the main subject.

The left viewpoint image L is converted on the basis of: the correction amount Factor2 (x, y) of the per-pixel parallax which is set as described above; and the conversion factor Factor1 [i] of the per-image parallax which is set in Step S2, whereby six multi-viewpoint images C0 to C5 are generated (Step S9). That is, each pixel Cn (x, y) of the multi-viewpoint image Cn is calculated as follows from each pixel L (x, y) of the left viewpoint image L.

$$Cn(x+Factor1[n] \times Factor2(x,y) \times newD(x,y) = L(x,y)$$ Equation 1

Figure 2E:
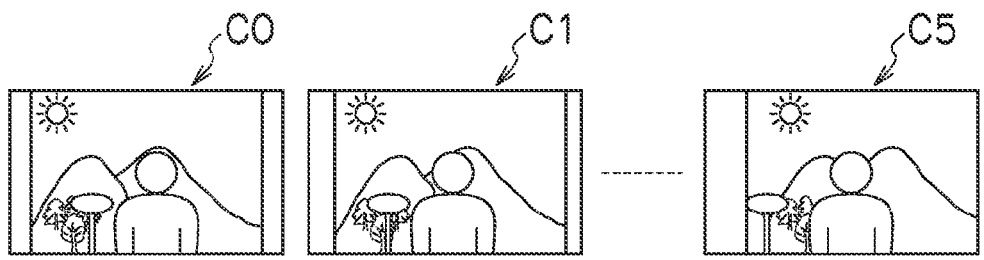
FIG. 2E is a view illustrating multi-viewpoint images C0 to C5.

FIG. 2E is a view illustrating the multi-viewpoint images C0 to C5 thus generated, in which C2 to C4 are omitted. The parallax of the main subject on each of the multi-viewpoint images C0 to C5 is 0.

Next, the six multi-viewpoint images C0 to C5 are each shifted in the horizontal direction so that the parallax of the main subject on the multi-viewpoint images C0 to C5 becomes a predetermined parallax D [target], whereby final multi-viewpoint images S0 to S5 are generated (Step S10). That is, each pixel Sn (x, y) of the final multi-viewpoint image Sn is calculated as follows from each pixel Cn (x, y) of the multi-viewpoint image Cn.

$$Sn(x,y)=Cn(x-D[\text{target}]\times \text{Factor1}[n]/\text{Factor1}[5],y) \quad \text{Equation 2}$$

Figure 2F:
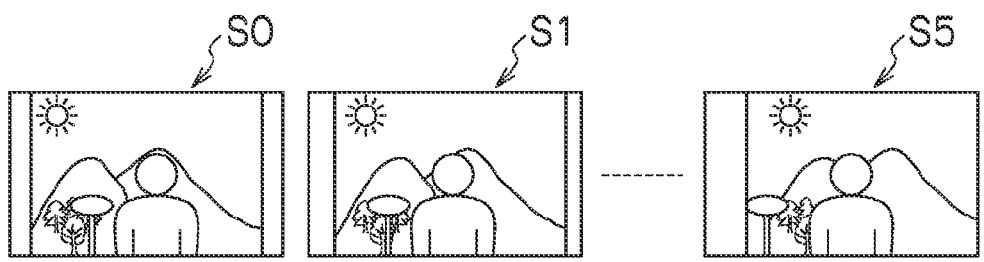
FIG. 2F is a view illustrating final multi-viewpoint images S0 to S5.

FIG. 2F is a view illustrating the final multi-viewpoint images S0 to S5 thus generated, in which S2 to S4 are omitted. The parallax of the main subject on each of the final multi-viewpoint images S0 to S5 is appropriately set.

A stereoscopic image for output is generated from the six final multi-viewpoint images S0 to S5 (Step S11). In this step, a processing method suited to each output apparatus, such as multi-viewpoint lenticular image conversion and image conversion for a multi-viewpoint liquid crystal barrier monitor, is adopted.

Lastly, the generated stereoscopic image is outputted to the output apparatus (Step S12).

In this way, from the inputted two-viewpoint images, the multi-viewpoint images are generated by using the conversion factor of the per-image parallax and the correction amount of the per-pixel parallax which is set in accordance with the difference to the parallax of the main subject, and the images are shifted on the basis of the target parallax of the main subject, whereby the final multi-viewpoint images are generated, and as a result, it is possible to obtain the stereoscopic image having the parallax of the entire image and the parallax of the main subject which are appropriate.

In the present embodiment, the parallax D (x, y) is calculated with reference to the left viewpoint image L, and on the basis of the calculated parallax D (x, y), the final multi-viewpoint images S0 to S5 are generated with reference to the left viewpoint image L, and it is preferable that, according to the same procedure, the parallax D (x, y) be calculated with reference to the right viewpoint image R, and on the basis of the calculated parallax D (x, y), the final multi-viewpoint images S5 to S0 be generated with reference to the right viewpoint image R, and then the respective multi-viewpoint images generated with reference to the left viewpoint image L and the respective multi-viewpoint images generated with reference to the right viewpoint image R be composited with each other. It should be noted that the multi-viewpoint images C0 to C5 may be composited with reference to the right and left viewpoint images, and the final multi-viewpoint images S0 to S5 may be generated on the basis of the composite multi-viewpoint images C0 to C5.

In addition, in the present embodiment, the per-pixel parallax is acquired, and accordingly the correction amount of the per-pixel parallax is calculated, alternatively, a per-region parallax may be acquired, and accordingly the correction amount of the per-region parallax may be calculated. In addition, the correction amount of the per-image parallax may be calculated.

Second Embodiment

Here, description is given of an example in which the main subject is detected from collateral information of the image, and the correction amount Factor2 according to the detected main subject is set.

Figure 5:
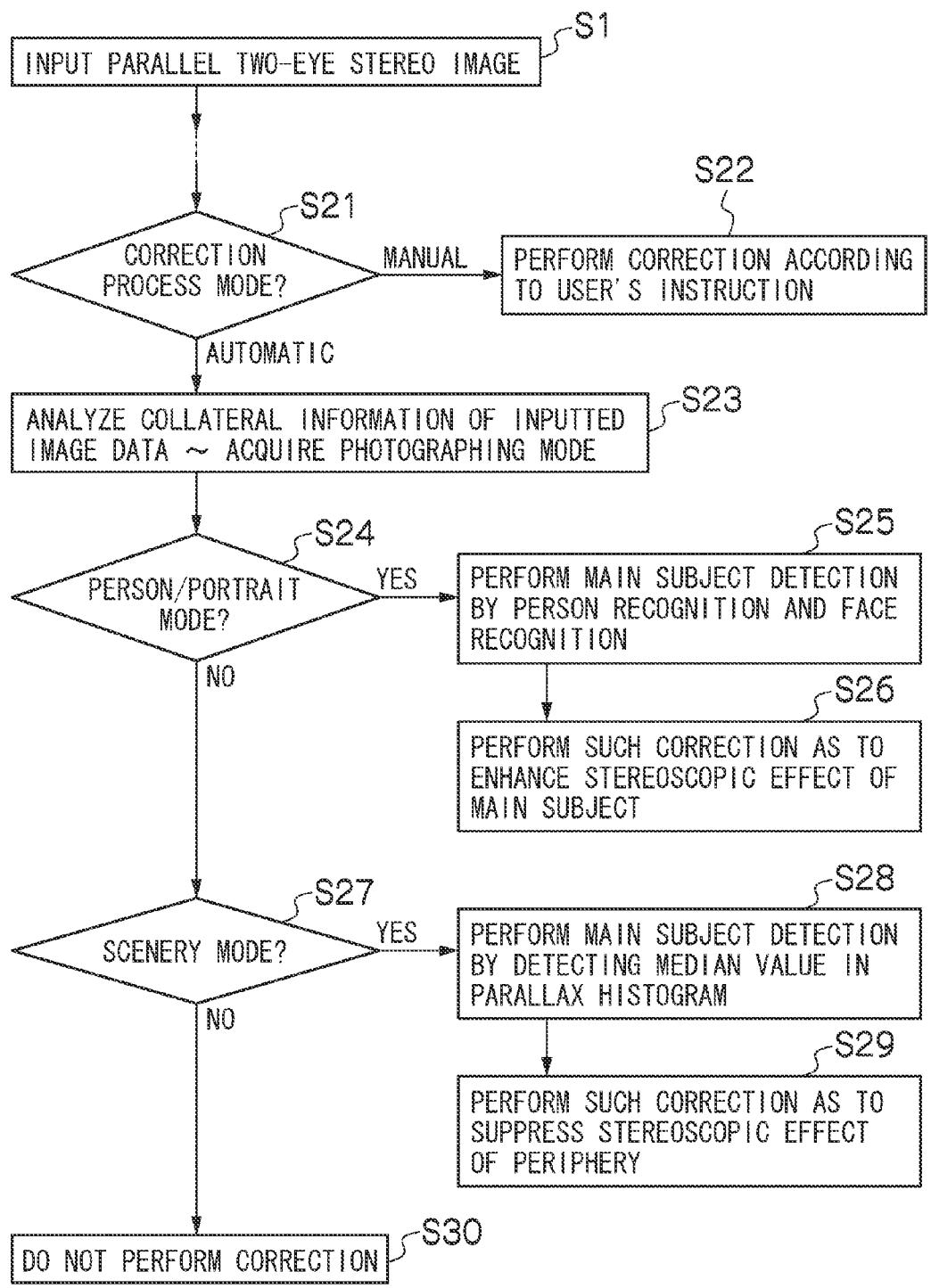
FIG. 5 is a flow chart illustrating a process for setting Factor2 according to a main subject.

First, as illustrated in a flow chart of FIG. 5, when the parallel two-eye stereo image (two-viewpoint images) is inputted (Step S1), a correction process mode which is set in advance by a user is determined (Step S21). In the case where the correction process mode is set to a manual mode, correction according to a user's instruction is performed (Step S22).

Meanwhile, in the case where the correction process mode is set to an automatic mode, the photographing mode which is set to an image pick-up apparatus when the inputted two-viewpoint images are photographed by the image pick-up apparatus is acquired from collateral information of the inputted two-viewpoint image data (Step S23).

Next, it is determined whether or not the acquired photographing mode is a person/portrait mode (Step S24). In the case where the acquired photographing mode is the person/portrait mode, the main subject can be considered to be a person, and hence main subject detection is performed by person recognition and face recognition (Step S25). In addition, the correction amount Factor2 for performing such correction as to enhance the stereoscopic effect of the detected main subject is set (Step S26).

In this way, because the main subject on the image photographed in the person/portrait mode is clear, such correction as to enhance the stereoscopic effect of the main subject is performed.

Meanwhile, in the case where the acquired photographing mode is not the person/portrait mode, it is next determined whether or not the acquired photographing mode is a scenery mode (Step S27). In the case where the acquired photographing mode is the scenery mode, the main subject detection is performed by detecting a median value in the parallax histogram (Step S28), and the correction amount Factor2 for performing such correction as to suppress the stereoscopic effect of the periphery is set (Step S29).

In this way, because the main subject on the image photographed in the scenery mode is unclear, the main subject region is detected by using the center-weighted parallax histogram. Further, the image photographed in the scenery mode has extremely large parallax distribution, and hence in order to prevent excessively strong parallax in the short-distance view and the long-distance view from making stereoscopic view impossible, the correction is performed so as to suppress the stereoscopic effect of a region having a parallax which is significantly different from that of the main subject.

It should be noted that, in the case where the photographing mode acquired from the collateral information of the image data is not any one of the person/portrait mode and the scenery mode, the correction is not performed (Step S30).

In this way, the main subject is detected from the collateral information of the image data, and Factor2 according to the detected main subject is set, whereby the correction suited to the main subject can be performed.

Third Embodiment

With reference to FIG. 6, a generation process for multi-viewpoint images according to a third embodiment is described. In the present embodiment, multi-viewpoint images are generated by compressing the parallax in accordance with the conversion factor of the parallax, and in the case where a range of the parallax of the main subject on the multi-viewpoint images thus generated is smaller than a range of the target parallax, the correction amount is set so as to enhance the stereoscopic effect of the main subject.

Similarly to the first embodiment, when the two-viewpoint images are inputted (Step S1), the main subject is detected from the left viewpoint image L, and the region $(x_{topleft}, y_{topleft})-(x_{bottomright}, y_{bottomright})$ of the main subject within the image is acquired (Step S3), and with reference to the left viewpoint image L, the per-pixel parallax D (x, y) to the right viewpoint image R is acquired (Step S4), and the parallax D [main] of the main subject is acquired (Step S5).

Next, the right viewpoint image R is shifted in the horizontal direction by the parallax D [main] so that the parallax of the main subject between the left viewpoint image L and the right viewpoint image R becomes 0 (Step S6), and the per-pixel parallax is updated (Step S7).

Here, a maximum value D [main] max and a minimum value D [main] min in the parallax distribution of pixels contained in the region $(x_{topleft}, y_{topleft})$–$(x_{bottomright}, y_{bottomright})$ of the main subject on the left viewpoint image L are acquired (Step S31).

Further, a maximum value D [entirety] max and a minimum value D [entirety] min in the parallax distribution of all pixels excluding 10% of the image periphery of the left viewpoint image L are acquired (Step S32).

Next, on the basis of: a maximum value D [target entirety] max and a minimum value D [target entirety] min in predetermined target parallax distribution of the entire image; and the maximum value D [entirety] max and the minimum value D [entirety] min in the parallax distribution of all the pixels acquired in Step S32, the conversion factor Factor1 of the per-image parallax is set (Step S33).

The setting of the conversion factor is described with reference to a flow chart of FIG. 7.

First, it is determined whether or not D [target entirety] max≧D [entirety] max and D [target entirety] min≦D [entirety] min, that is, whether or not the parallax distribution of all the pixels falls within the target parallax distribution (Step S41). If yes, a variable tmp is set to 1, and similarly to the first embodiment, the conversion factors Factor1 [0] to Factor1 [5] of the per-image parallax are set to 0, 0.2, 0.4, 0.6, 0.8, and 1.0, respectively (Step S42).

In the case where the parallax distribution of all the pixels does not fall within the target parallax distribution, the variable tmp is set to a larger value of D [entirety] max/D [target entirety] max and D [entirety] min/D [target entirety] min. In addition, with the use of the variable tmp, the conversion factors Factor1 [0] to Factor1 [5] of the per-image parallax are set to 0, 0.2/tmp, 0.4/tmp, 0.6/tmp, 0.8/tmp, and 1.0/tmp, respectively (Step S43).

Figure 8A:
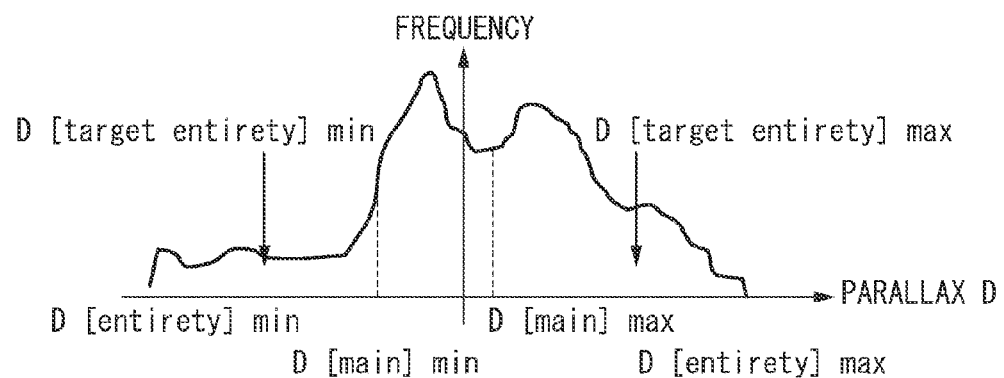
FIG. 8A is a graph illustrating parallax distribution.

For example, in the case where the inputted two-viewpoint images have parallax distribution illustrated in FIG. 8A, even if the multi-viewpoint images are generated at such parallaxes, the parallaxes are excessively large and thus make stereoscopic view impossible. Accordingly, the per-pixel parallax is divided by the variable tmp, to be thereby converted into parallax distribution illustrated in FIG. 8B, so that the parallax distribution is caused to fall within the target parallax distribution. According to the parallax distribution after the conversion, the conversion factor Factor1 of the per-image parallax between the multi-viewpoint images is set.

In this way, the conversion factor Factor1 of the per-image parallax is appropriately set on the basis of the parallax distribution of all the pixels and the target parallax distribution of the entire image.

Next, on the basis of: a maximum value D [target main] max and a minimum value D [target main] min in predetermined target parallax distribution of the main subject; and the maximum value D [main] max and the minimum value D [main] min of the parallax distribution of the main subject (in the case where the parallax distribution of all the pixels is corrected by Factor1, the parallax distribution of the main subject after the correction), the correction amount Factor2 of the per-pixel parallax is set (Step S34).

The setting of the correction amount is described with reference to a flow chart of FIG. 9.

First, it is determined whether or not D [target main] max–D [target main] min≦(D [main] max–D [main] min)/tmp, that is, whether or not the parallax range of the main subject is wider than the target parallax range (Step S51). In the case where the parallax range of the main subject is wider (YES in Step S51), it is determined that the stereoscopic effect of the main subject is sufficient, and the correction amount Factor2 of the per-pixel parallax is set to 1 (Step S52). That is, the correction of the per-pixel parallax is not performed.

In addition, in the case where the target parallax range is wider (NO in Step S51), it is determined that the stereoscopic effect of the main subject is insufficient, and the correction amount Factor2 is set so as to increase the parallax of the main subject. Here, the correction amount Factor2 is set according to the function Table (x) illustrated in FIG. 4D, so that xmin=D [main] min/tmp and xmax=D [main] max/tmp (Step S53). That is, Factor2 is set so that the parallax is uniformly increased in D [main] min/tmp to D [main] max/tmp, and the magnification factor of the parallax is more reduced in proportion to an increase in deviation from the parallax of the main subject in a portion smaller than D [main] min and a portion larger than D [main] max/tmp.

Figure 8B:
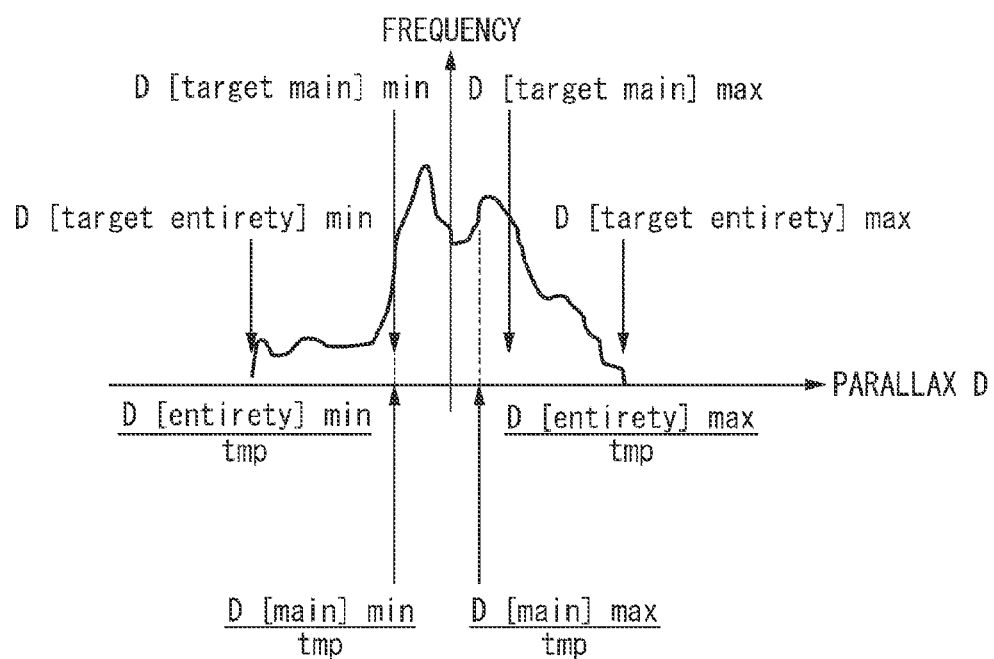
FIG. 8B is a graph illustrating the parallax distribution.

For example, in the case of the parallax distribution of the main subject and the target parallax distribution of the main subject illustrated in FIG. 8B, the target parallax distribution is wider, and hence the correction amount Factor2 of the per-pixel parallax is set as in Step S53.

In this way, on the basis of: the actual parallax distribution of the main subject; and the target parallax distribution of the main subject, the appropriate correction amount Factor2 of the per-pixel parallax is set.

On the basis of: the correction amount Factor2 (x, y) of the per-pixel parallax which is set as described above; and the conversion factor Factor1 [i] of the per-image parallax which is set in Step S42 or Step S43, the six multi-viewpoint images C0 to C5 are generated (Step S9). Further, the final multi-viewpoint images S0 to S5 are generated so that the parallax of the main subject becomes the predetermined parallax D [target] (Step S10).

Lastly, the stereoscopic image for output is generated from the six final multi-viewpoint images S0 to S5 (Step S11), and the generated stereoscopic image is outputted (Step S12).

In this way, in the case where the range of the parallax of the main subject after the compression according to the conversion factor of the parallax is narrower than the range of the target parallax of the main subject, the correction is performed so as to enhance the stereoscopic effect of the main subject, whereby a stereoscopic image having an appropriate parallax of the main subject can be generated.

It should be noted that it is preferable to modify the target parallax in accordance with an output size of the multi-viewpoint image.

For example, in the case where the preset target parallax distribution of the entire image and the preset target parallax distribution of the main subject are suited to a predetermined reference output size, it is conceivable to make such a definition that a modification factor Factor3=the output size/the reference output size and modify the target parallax distribution according to the modification factor Factor3. That is, each of the maximum value D [target entirety] max and the minimum value D [target entirety] min in the target parallax distribution of the entire image and the maximum value D [target main] max and the minimum value D [target main] min in the target parallax distribution of the main subject is divided by the modification factor Factor3, to thereby modify the target parallax distribution, and the processing of Step S33 and Step S34 is performed on the basis of the modified value.

The magnitude of the parallax at which stereoscopic view is not possible is different depending on the size of an outputted image, and hence the target parallax is modified as described above in accordance with the output size of the multi-viewpoint image, whereby it is possible to generate the multi-viewpoint image having an appropriate parallax in accordance with the size of the outputted image.

Fourth Embodiment

Figure 10:
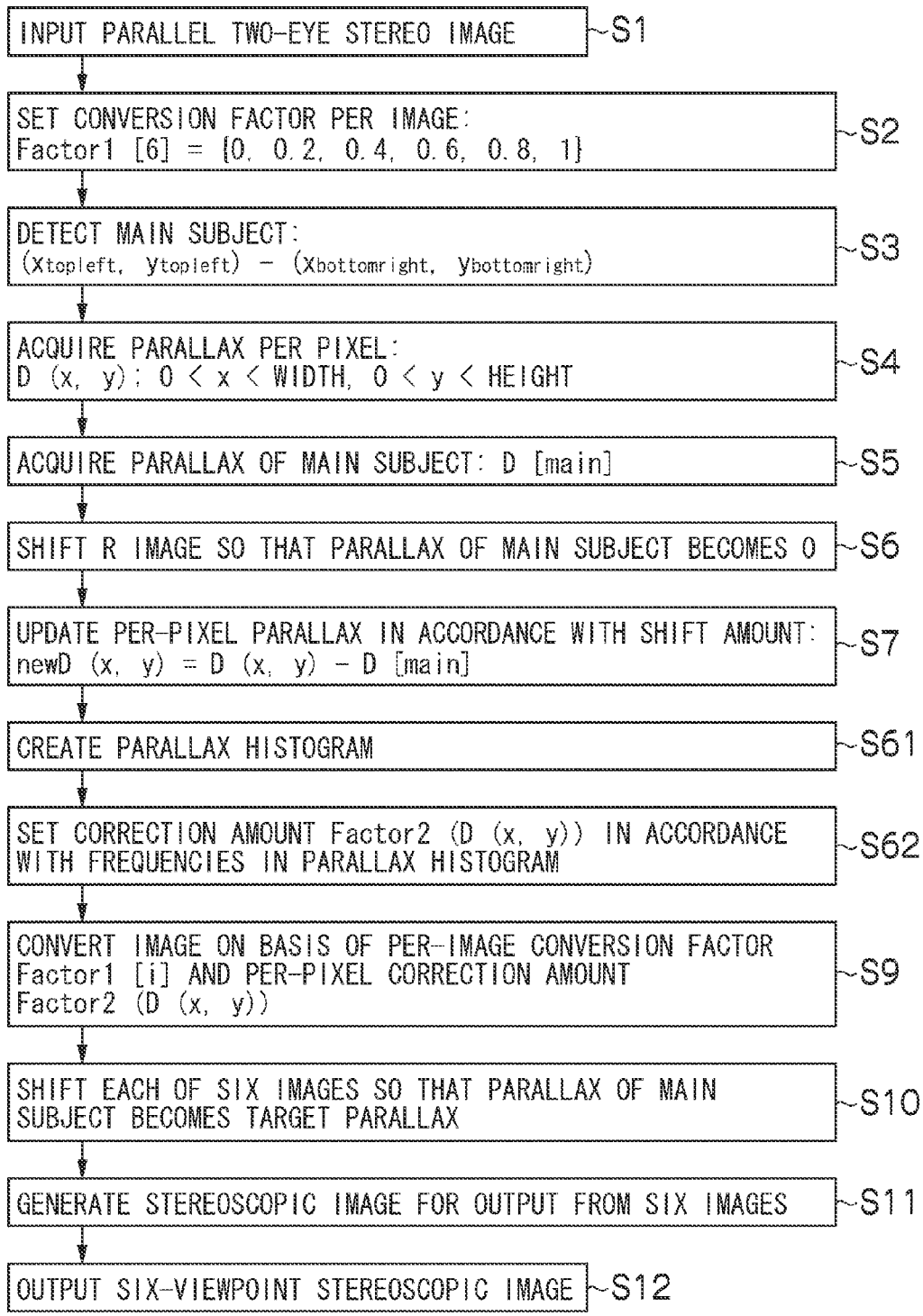
FIG. 10 is a flow chart illustrating a generation process for multi-viewpoint images according to a fourth embodiment.

With reference to FIG. 10, a generation process for multi-viewpoint images according to a fourth embodiment is described. In the present embodiment, the per-pixel correction amount Factor2 is set so as to planarize parallax gradations within the image.

The processing from Step S1 to Step S7 is the same as the above, and hence description thereof is omitted.

Next, a parallax histogram is created from the per-pixel parallax acquired in Step S4 (Step S61), and the per-pixel correction amount Factor2 is set in accordance with the created histogram (Step S62). In this step, Factor2 is set on the basis of the following expression.

$$\text{Factor2}(D) = \frac{1}{\text{Hist}(0)} \times \frac{\sum_{x=0}^{D} \text{Hist}(x)}{|D| + 1} \qquad \text{[Expression 2]}$$

Figure 11A:
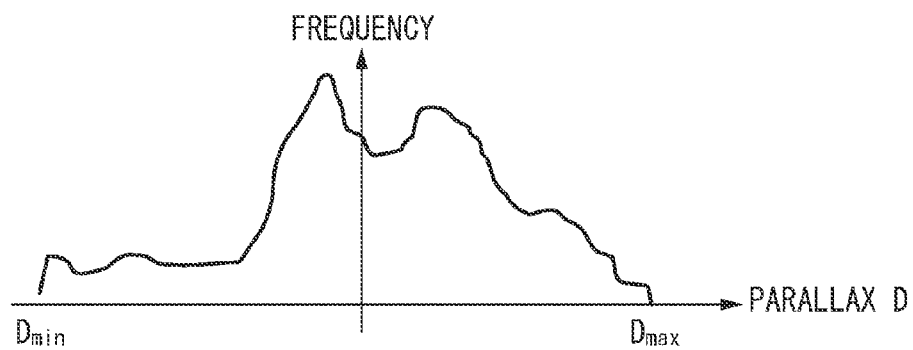
FIG. 11A is a graph illustrating the parallax distribution.
Figure 11B:
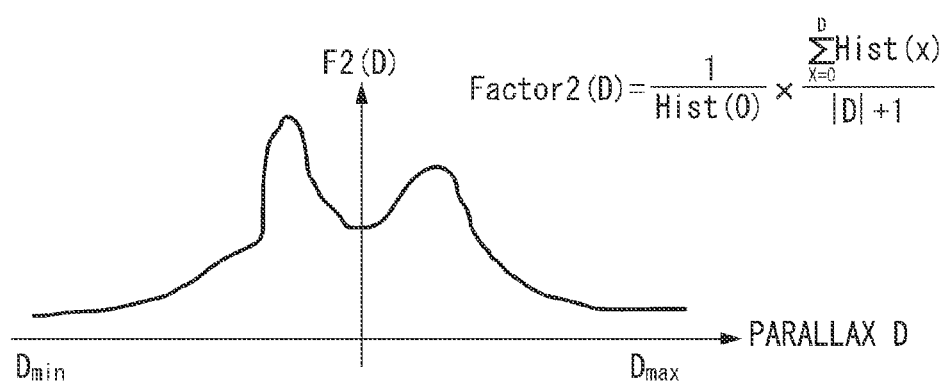
FIG. 11B is a graph illustrating the correction amount Factor2.

For example, in the case of parallax distribution illustrated in FIG. 11A, the per-pixel correction amount Factor2 (F2 (D)) calculated on the basis of [Expression 2] is set as illustrated in FIG. 11B.

The subsequent processing from Step S10 to Step S12 is the similar to those of the above embodiment, and hence description thereof is omitted.

In this way, the correction amount of the parallax is increased to enhance the stereoscopic effect in a portion having higher frequencies in the parallax histogram, and the correction amount of the parallax is reduced to suppress the stereoscopic effect in a portion having lower frequencies, whereby the contrast of the parallax is made uniform. Accordingly, it becomes easier for a user to discriminate long-distance view and short-distance view from each other and to discriminate and recognize the stereoscopic effect.

Fifth Embodiment

Figure 12:
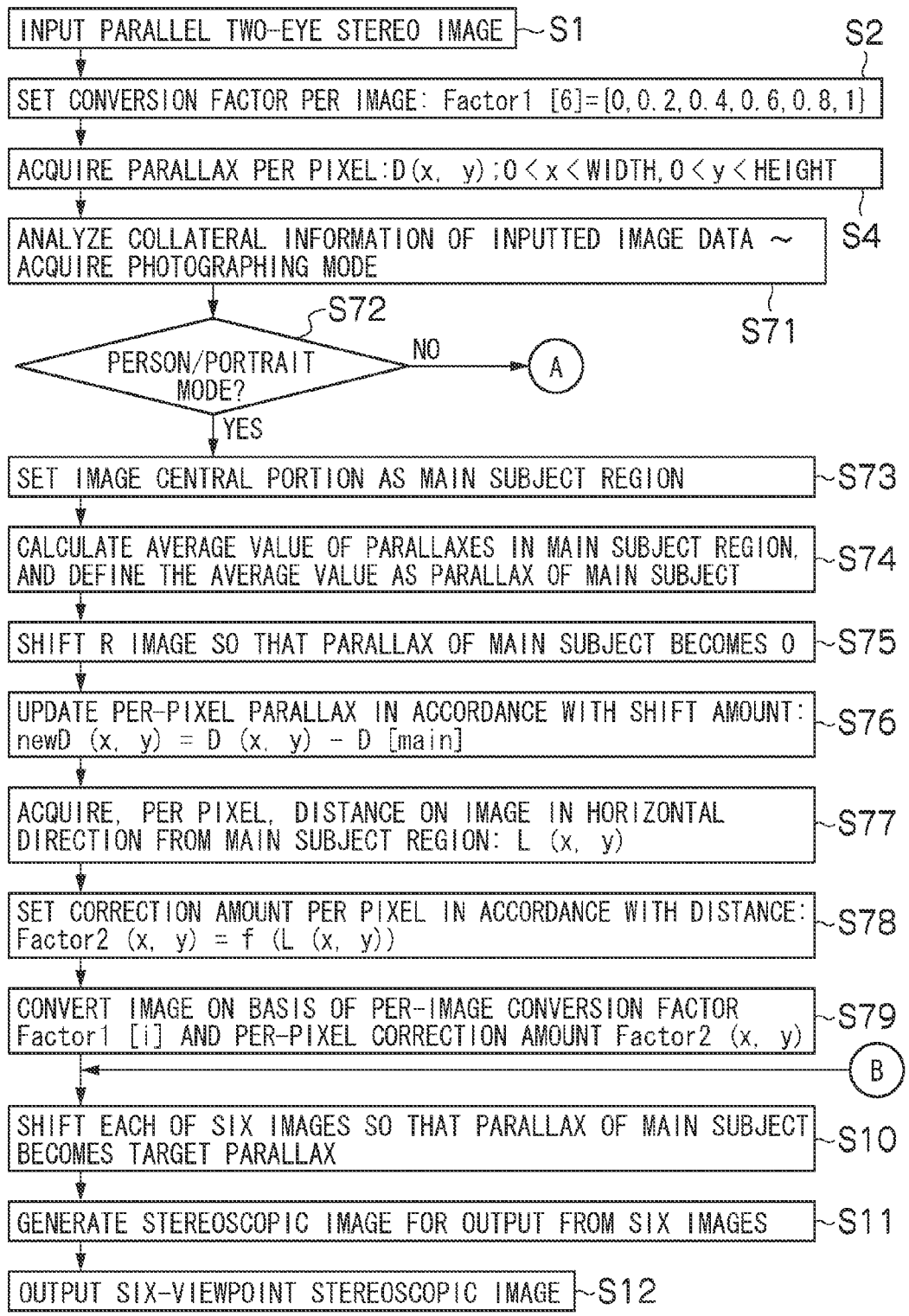
FIG. 12 is a flow chart illustrating a generation process for multi-viewpoint images according to a fifth embodiment.
Figure 13:
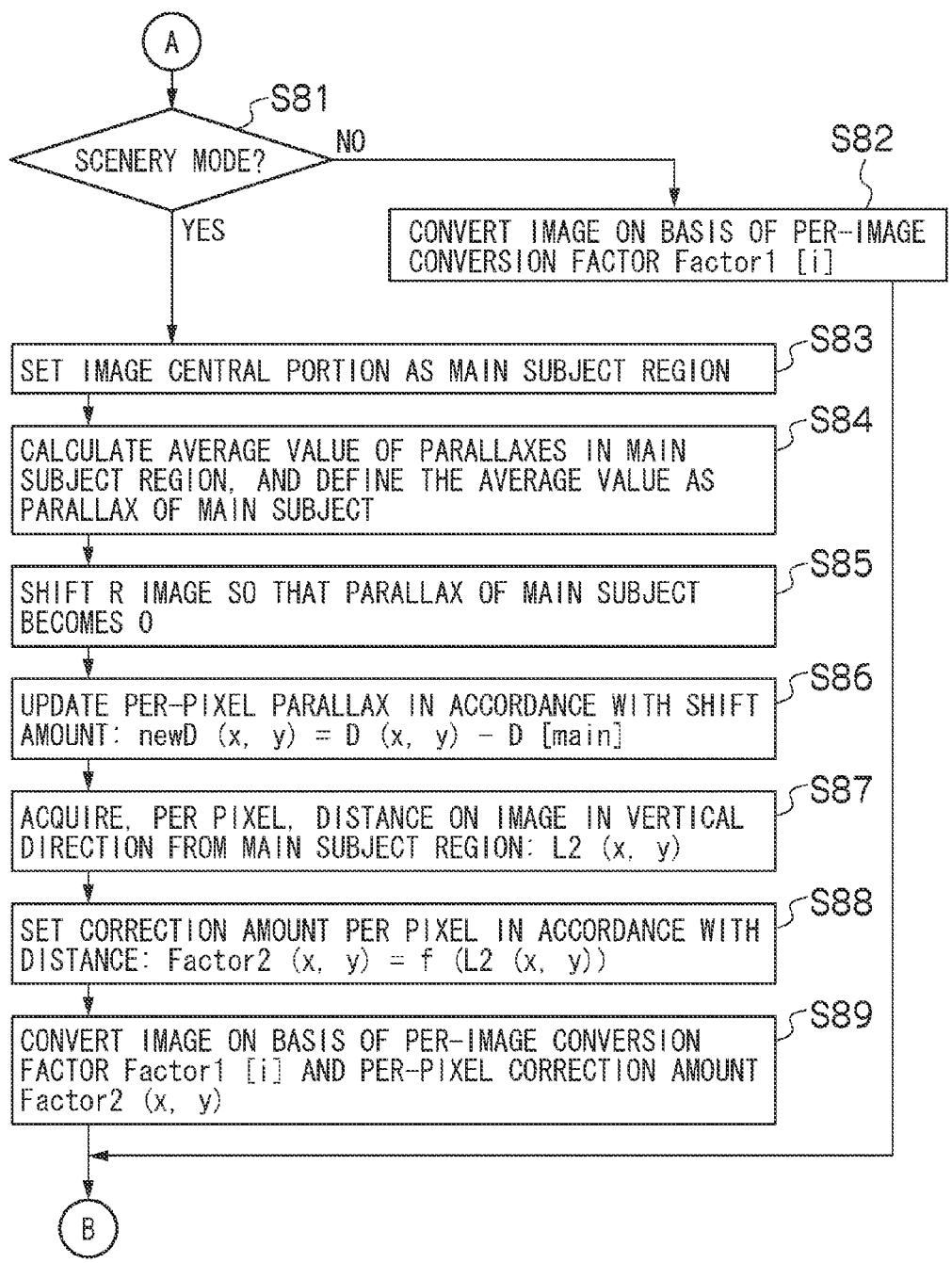
FIG. 13 is a flow chart illustrating the generation process for the multi-viewpoint images according to the fifth embodiment.

With reference to FIG. 12 and FIG. 13, a generation process for multi-viewpoint images according to a fifth embodiment is described. In the present embodiment, the main subject region is set in accordance with the photographing mode at the time of photographing the two-viewpoint images.

When the two-viewpoint images are inputted (Step S1), the conversion factor Factor1 of the per-image parallax is set (Step S2), and the per-pixel parallax D (x, y) is acquired (Step S4).

Next, the photographing mode which has been set to the image pick-up apparatus when the inputted two-viewpoint images has been photographed by the image pick-up apparatus is acquired from the collateral information of the inputted two-viewpoint image data (Step S71), and it is determined whether or not the acquired photographing mode is the person/portrait mode (Step S72).

In the case where the person/portrait mode has been set (YES in Step S72), an image central portion of a plurality of regions obtained by vertically dividing the left viewpoint image L is set as the main subject region (Step S73). For example, as illustrated in FIG. 14A, the left viewpoint image L is vertically divided equally into three, and a central region A1 is set as the main subject region.

An average value of parallaxes in the main subject region is calculated, and is defined as the parallax D [main] of the main subject (Step S74). Further, the right viewpoint image R is shifted in the horizontal direction by the parallax D [main] so that the parallax of the main subject between the left viewpoint image L and the right viewpoint image R becomes 0 (Step S75), and the per-pixel parallax acquired in Step S4 is updated in accordance with the parallax D [main] which is the shift amount (Step S76).

Next, a distance L (x, y) on the image in the horizontal direction from the main subject region is acquired per pixel (Step S77), and the per-pixel correction amount Factor2 (x, y)=f (L (x, y)) is set in accordance with the distance (Step S78).

Figure 14A:
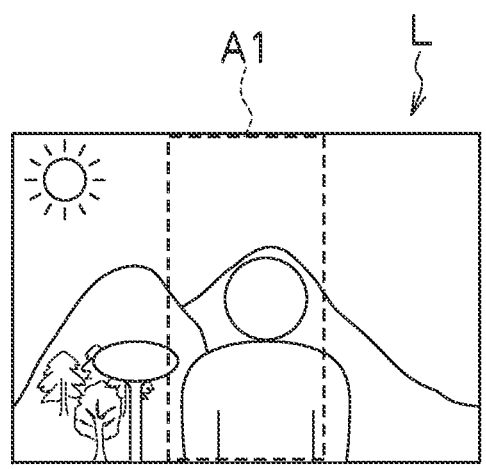
FIG. 14A is a view for describing equal division of the left viewpoint image.

For example, in the example of FIG. 14A, Factor2 (x, y) is set so that the parallax is uniformly increased in the main subject region A1, and the magnification factor of the parallax is more reduced in proportion to an increase in deviation in the horizontal direction from the main subject region in regions to the right and left of the main subject region A1.

On the basis of: the per-pixel correction amount Factor2 (x, y) thus set; and the per-image conversion factor Factor1 set in Step S2, the left viewpoint image L is converted, and the six multi-viewpoint images C0 to C5 are generated (Step S79).

The subsequent processing from Step S10 to Step S12 is the same as the above, and hence description thereof is omitted.

Meanwhile, in the case where the acquired photographing mode is not the person/portrait mode (NO in Step S72), the processing proceeds to a flow chart of FIG. 13, it is determined whether or not the acquired photographing mode is the scenery mode (Step S81).

In the case where the acquired photographing mode is not the scenery mode (NO in Step S81), the per-pixel correction is not performed, the left viewpoint image L is converted on the basis of the per-image conversion factor Factor1, and the six multi-viewpoint images C0 to C5 are generated (Step S82).

Figure 14B:
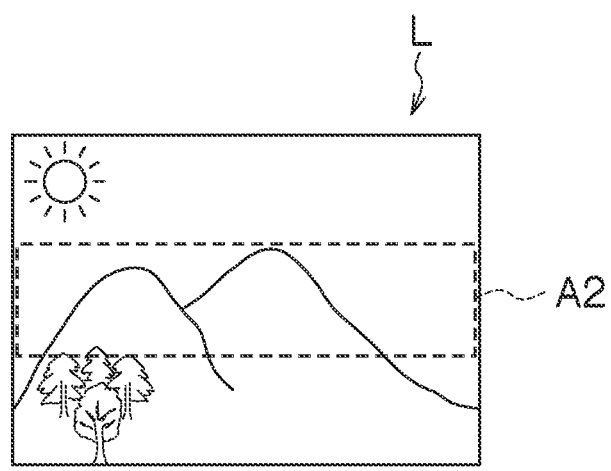
FIG. 14B is a view for describing the equal division of the left viewpoint image.

In the case where the acquired photographing mode is the scenery mode (YES in Step S72), a central portion of a plurality of regions obtained by horizontally dividing the image is set as the main subject region (Step S83). For example, as illustrated in FIG. 14B, the left viewpoint image L is horizontally divided equally into three, and a central region A2 is set as the main subject region.

An average value of parallaxes in the main subject region is calculated, and is defined as the parallax D [main] of the main subject (Step S84). Further, the right viewpoint image R is shifted in the horizontal direction by the parallax D [main] so that the parallax of the main subject between the left viewpoint image L and the right viewpoint image R becomes 0 (Step S85), and the per-pixel parallax acquired in Step S4 is updated in accordance with the parallax D [main] which is the shift amount (Step S86).

Next, a distance L2 (x, y) on the image in the vertical direction from the main subject region is acquired per pixel (Step S87), and the per-pixel correction amount Factor2 (x, y)=f (L2 (x, y)) is set in accordance with the distance (Step S88).

For example, in the example of FIG. 14B, Factor2 (x, y) is set so that the correction is not performed in the main subject region A2, and the parallax is more suppressed in proportion to an increase in deviation in the vertical direction from the main subject region in regions above and below the main subject region A2.

On the basis of: the per-pixel correction amount Factor2 (x, y) thus set; and the per-image conversion factor Factor1 set in Step S2, the left viewpoint image L is converted, and the six multi-viewpoint images C0 to C5 are generated (Step S89).

In this way, the photographing mode at the time of photographing the two-viewpoint images is acquired from the collateral information, and the main subject region is estimated on the basis of the photographing mode, whereby an appropriate parallax amount can be given without calculating the parallax distribution.

Sixth Embodiment

Figure 15:
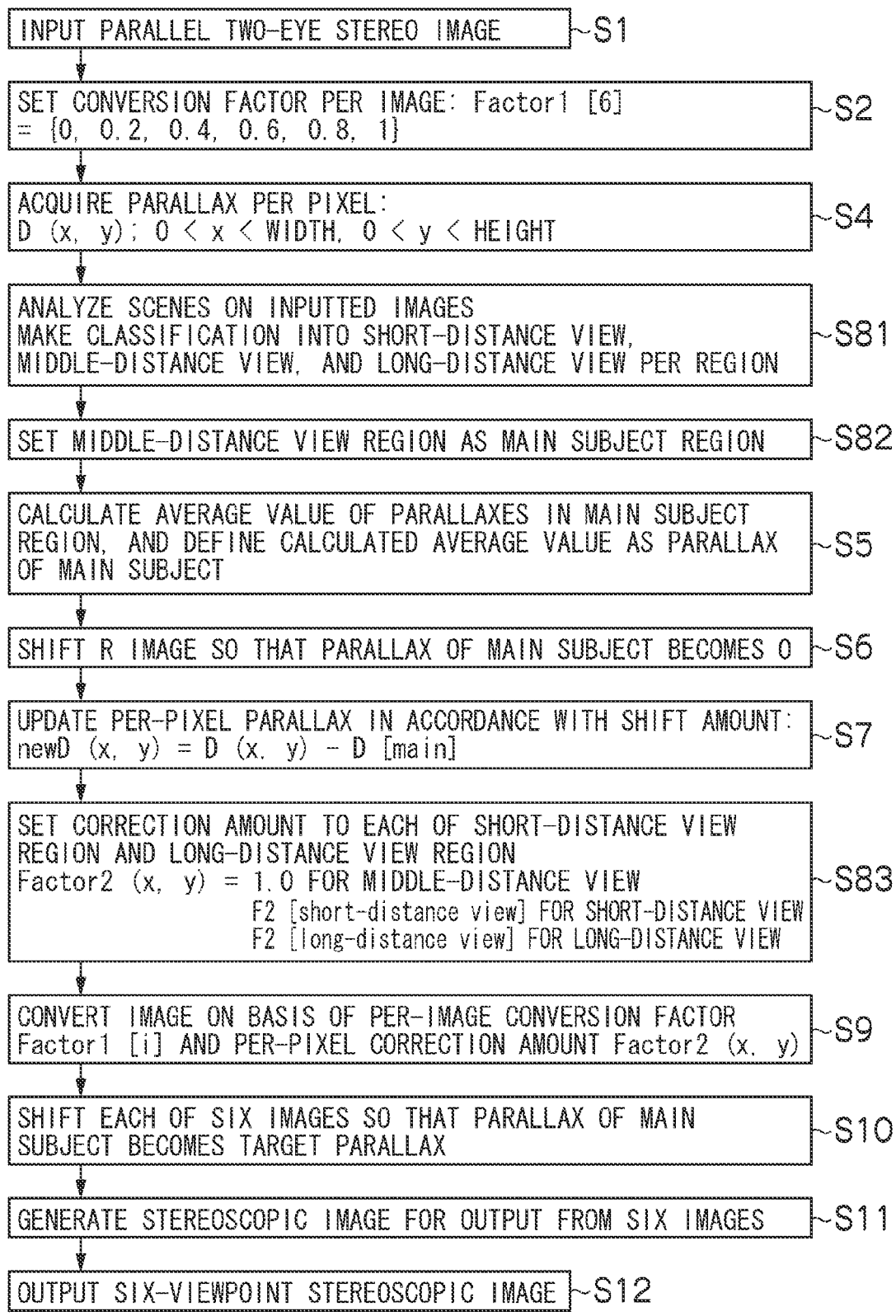
FIG. 15 is a flow chart illustrating a generation process for multi-viewpoint images according to a sixth embodiment.

With reference to FIG. 15, a generation process for multi-viewpoint images according to a sixth embodiment is described. In the present embodiment, scenes on the inputted two-viewpoint images are analyzed, to thereby discriminate short-distance view, middle-distance view, and long-distance view from one another, and the middle-distance view region is set as the main subject.

When the two-viewpoint images are inputted (Step S1), the conversion factor Factor1 of the per-image parallax is set (Step S2), and the per-pixel parallax D (x, y) is acquired (Step S4).

Next, scenes on the inputted two-viewpoint image data are analyzed, classification into the short-distance view, the middle-distance view, and the long-distance view is performed per region (Step S81), and the middle-distance view region is set as the main subject (Step S82). In the scene analysis, for example, the left viewpoint image L is divided into a plurality of regions, and a brightness histogram is created per divided region, and then, a region having wide brightness distribution, that is, a region having high contrast is classified into the short-distance view, and a region having narrow brightness distribution, that is, a region having low contrast is classified into the long-distance view.

Next, on the basis of the per-pixel parallax D (x, y) acquired in Step S4, an average value of parallaxes in the main subject region set in Step S81 is calculated, and the parallax D [main] of the main subject is acquired (Step S5).

Further, the right viewpoint image R is shifted in the horizontal direction by the parallax D [main] so that the parallax of the main subject between the left viewpoint image L and the right viewpoint image R becomes 0 (Step S6), and the per-pixel parallax is updated (Step S7).

Then, the per-pixel correction amount Factor2 is set to each of the short-distance view region, the middle-distance view region, and the long-distance view region (Step S83).

For example, it is conceivable to set Factor2 (x, y) so that the parallax is uniformly increased in the middle-distance view region, and the correction is not performed in the short-distance view region and the long-distance view region, and it is also conceivable to set Factor2 (x, y) so that the correction is not performed in the middle-distance view region, and the parallax is suppressed in the short-distance view region and the long-distance view region.

The subsequent processing from Step S9 to Step S12 is similar to the above, and hence description thereof is omitted.

In this way, the short-distance view, the middle-distance view, and the long-distance view are discriminated by the scene analysis, and then, even in the case where the per-pixel parallax D (x, y) is erroneously calculated by corresponding point detection, the middle-distance view region can be appropriately set as the main subject region.

Other Modified Examples

In the first and other embodiments, the conversion factors Factor1 (0) to Factor1 (5) of the per-image parallax are set to 0, 0.2, 0.4, 0.6, 0.8, and 1.0, respectively, but may be set at irregular intervals, for example, to 0, 0.1, 0.3, 0.7, 0.9, and 1.0.

When the conversion factors are set as described above, for example, the parallax between the final multi-viewpoint images S0-S1 and the parallax between the final multi-viewpoint images S4-S5 are compressed to diminish the stereoscopic effect, so that image failure is more avoidable. Further, the stereoscopic effect between the viewpoint images S1-S2 and the stereoscopic effect between the viewpoint images S3-S4 can be reproduced as they are. Still further, the stereoscopic effect between the viewpoint images S2-S3 can be enhanced.

In this way, the conversion factor Factor1 of the per-image parallax may be set at regular intervals, or may be set so that a difference in parallax conversion factor between images in the central portion is larger than a difference in parallax conversion factor between images at both end portions.

In addition, the conversion factor Factor1 of the per-image parallax and the correction amount Factor2 of the per-pixel parallax are calculated, and then the respective viewpoint images C0 to C5 are generated with reference to the left viewpoint image L, but the respective viewpoint images may be generated with reference to the central portion of the viewpoints of the generated multi-viewpoint images.

For example, instead of Equation 1, the use of Equation 3 given below makes it possible to define the central portion of the respective viewpoints (in the case of the six multi-viewpoint images, a portion between the viewpoint images C2 and C3) as the reference of the respective viewpoint images.

$$Cn(x+\text{Factor1}(n)\times(\text{Factor2}(x,y)-1.0)/2\times\text{new}D(x,y),y)= L(x,y) \quad \text{Equation 3}$$

If the left viewpoint image L is used as the reference, there is a possibility that image distortion caused by the per-pixel parallax which is more enhanced/suppressed toward the right viewpoint image becomes larger, in contrast, if the central portion of the respective viewpoints is used as the reference, the image distortion can be distributed equally to the right and left, so that natural multi-viewpoint images can be generated.

<Configuration of Image Processing Apparatus>

Figure 16:
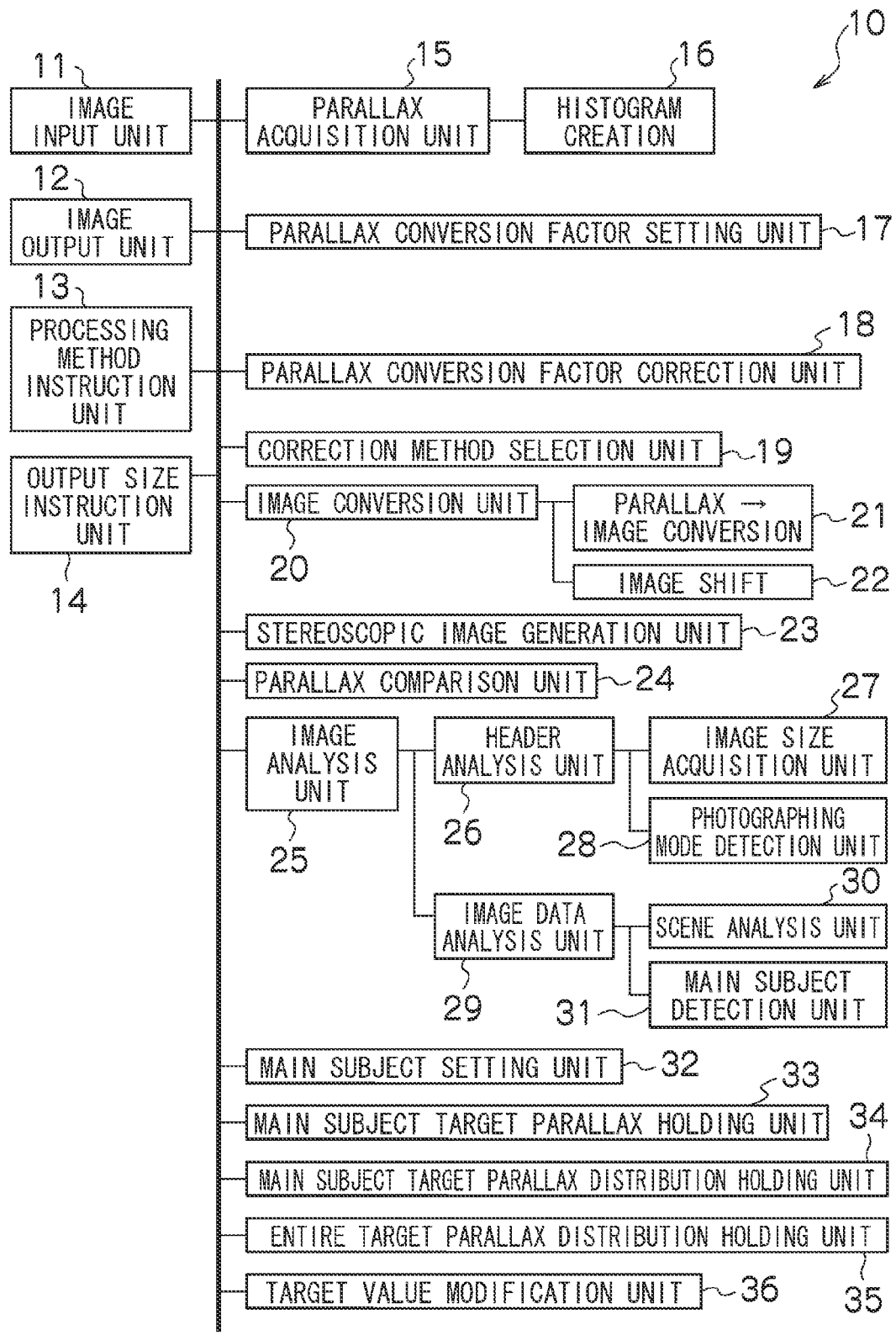
FIG. 16 is a block diagram illustrating an image processing apparatus 10.

FIG. 16 is a block diagram illustrating an image processing apparatus 10 for implementing the first to sixth embodiments. The image processing apparatus 10 is configured by, for example, a personal computer and a workstation. The image processing apparatus 10 includes an image input unit 11, an image output unit 12, a processing method instruction unit 13, a parallax acquisition unit 15, a parallax conversion factor setting unit 17, a parallax conversion factor correction unit 18, an image conversion unit 20, and a stereoscopic image generation unit 23.

The image input unit 11 receives the left viewpoint image L and the right viewpoint image R (two-viewpoint images) which are photographed as a stereo image, and corresponds to, for example: an image reading apparatus which reads a multi-picture file (MP file) in which multi-viewpoint images for a stereoscopic image are coupled to each other, from a recording medium which stores therein the MP file; and an apparatus which acquires the MP file via a network.

The image output unit 12 outputs the generated stereoscopic image, and corresponds to: a printing apparatus for a stereoscopic photographic print having a surface on which a lenticular lens sheet is attached; a parallax barrier monitor; and the like.

The processing method instruction unit 13 is an operation unit for setting the correction process mode of the automatic mode/the manual mode which is determined in Step S21 of FIG. 5, and for setting the per-image conversion factor Factor1 and the per-pixel correction amount Factor2. In addition, an output size instruction unit 14 is an operation unit for giving a size instruction of a stereoscopic image to be outputted.

These units are configured by a keyboard and a pointing device. It should be noted that the output size instruction unit 14 may be configured to automatically acquire the output size of the image output unit 12.

The parallax acquisition unit 15 acquires the per-pixel or per-region parallax D (x, y) between the left viewpoint image L and the right viewpoint image R received by the image input unit 11, and is used in, for example, Step S4 of FIG. 1.

A histogram creation unit 16 creates a parallax histogram on the basis of the per-pixel or per-region parallax D (x, y) acquired by the parallax acquisition unit 15, and is used in, for example, Step S61 of FIG. 10.

The parallax conversion factor setting unit 17 sets the conversion factors Factor1 (0) to Factor1 (5) of the parallaxes between the respective viewpoint images. On the basis of an input from the processing method instruction unit 13, it sets the conversion factors at regular intervals, for example, to 0, 0.2, 0.4, 0.6, 0.8, and 1.0, and sets the conversion factors so that a difference in parallax conversion factor between images in the central portion is larger than a difference in parallax conversion factor between images at both end portions, for example, to 0, 0.1, 0.3, 0.7, 0.9, and 1.0.

The parallax conversion factor correction unit 18 decides the correction amounts of the respective viewpoint images so that the correction amount of the parallax of an image to be used as the reference becomes 0 or smallest. For example, the use of Equation 1 makes it possible to obtain the correction amount with reference to the left viewpoint image L, and the use of Equation 3 makes it possible to define the portion between the viewpoint images C2 and C3 as the reference of the respective viewpoint images.

A correction method selection unit 19 selects a calculation method for the correction amount Factor2 in accordance with a detection result of a photographing mode detection unit 28 to be described later, and is used in, for example, Step S24 and Step S27 of FIG. 5.

The image conversion unit 20 includes a parallax→image conversion unit 21 and an image shift unit 22.

The parallax→image conversion unit 21 converts the image on the basis of the conversion factor Factor1 of the per-image parallax and the correction amount Factor2 of the per-pixel parallax, to thereby generate the multi-viewpoint images, and is used in, for example, Step S9 of FIG. 1.

In addition, the image shift unit 22 shifts the multi-viewpoint images in the horizontal direction in accordance with the parallax D [target], and is used in, for example, Step S10 of FIG. 1.

The stereoscopic image generation unit 23 generates the stereoscopic image for output on the basis of the generated final multi-viewpoint images, and is used in, for example, Step S11 of FIG. 1.

A parallax comparison unit 24 compares the per-pixel parallax with the parallax of the main subject, and is used in, for example, Step S8 of FIG. 1.

An image analysis unit 25 includes a header analysis unit 26 and an image data analysis unit 29.

The header analysis unit 26 acquires image information from the collateral information recorded in a header part of the image file, and includes: an image size acquisition unit 27 which acquires an image size; and a photographing mode detection unit 28 which acquires the photographing mode which is set at the time of photographing the images. The detection result of the photographing mode detection unit 28 is used in, for example, Step S24 and Step S27 of FIG. 5.

In addition, the image data analysis unit 29 analyzes image data on the basis of a pixel value of each pixel recorded in an image main part of the image file, and includes: a scene analysis unit 30 which analyzes a photographed scene; and a main subject detection unit 31 which detects the main subject within the image. An analysis result of the scene analysis unit 30 is used in, for example, Step S81 of FIG. 15. In addition, the main subject detection unit 31 includes a unit which detects a face of a person within the image as the main subject, and a detection result thereof is used in, for example, Step S3 of FIG. 1.

A main subject setting unit 32 sets the main subject region within the image on the basis of the detection result of the photographing mode detection unit 28 and the analysis result of the scene analysis unit 30, and is used in, for example, Step S73 of FIG. 12 and Step S83 of FIG. 13.

A main subject target parallax holding unit 33 holds the parallax D [target] which is the target parallax of the main subject on each final multi-viewpoint image, and the parallax D [target] is used in, for example, Step S10 of FIG. 1.

A main subject target parallax distribution holding unit 34 holds the target parallax distribution of the main subject, and an entire target parallax distribution holding unit 35 holds the target parallax distribution of the entire image. These target parallax distributions are used in, for example, Step S53 of FIG. 9 and Step S43 of FIG. 7.

A target value modification unit 36 modifies the target parallax between the multi-viewpoint images, and for example, calculates the modification factor Factor3 in accordance with an input from the output size instruction unit 14, and modifies the target parallaxes held by the main subject target parallax holding unit 33 and the main subject target parallax distribution holding unit 34 on the basis of the modification factor Factor3.

The first to sixth embodiments described above can be implemented by the image processing apparatus 10 thus configured.

It should be noted that, although every generation process for the multi-viewpoint images is realized by hardware herein, the generation process can also be realized as a multi-viewpoint image generation program for controlling the image processing apparatus 10.

REFERENCE SIGNS LIST

10 . . . image processing apparatus, 11 . . . image input unit, 12 . . . image output unit, 13 . . . processing method support unit, 15 . . . parallax acquisition unit, 16 . . . histogram creation unit, 17 . . . parallax conversion factor setting unit, 18 . . . parallax conversion factor correction unit, 20 . . . image conversion unit, 21 . . . parallax→image conversion unit, 22 . . . image shift unit, 23 . . . stereoscopic image generation unit, 25 . . . image analysis unit, 26 . . . header analysis unit, 29 . . . image data analysis unit, 32 . . . main subject setting unit

The invention claimed is:

1. An image processing apparatus comprising:
an image input unit configured to receive two-viewpoint images having a parallax therebetween;
a parallax acquisition unit configured to acquire a per-pixel or per-region parallax between the two-viewpoint images;
a main subject detection unit configured to detect a main subject on the two-viewpoint images;
a parallax acquisition unit configured to acquire a parallax of the main subject;
a setting unit configured to set a conversion factor of the parallax in accordance with respective viewpoint positions of multi-viewpoint images to be generated;
a correction unit configured to correct the conversion factor of the parallax per pixel, per region, or per image on a basis of the parallax of the main subject;
a multi-viewpoint image generation unit configured to convert at least one image of the two-viewpoint images in accordance with the corrected conversion factor of the parallax, to thereby generate the multi-viewpoint images;
an image adjustment unit configured to shift the two-viewpoint images or the multi-viewpoint images in a horizontal direction so that the parallax of the main subject on the multi-viewpoint images becomes a parallax appropriate for stereoscopic view; and
a stereoscopically-displayed image generation unit configured to generate a stereoscopically-displayed image on a basis of the multi-viewpoint images, wherein
the correction unit corrects the conversion factor of the parallax per pixel, per region, or per image on a basis of a difference between the per-pixel or per-region parallax and the parallax of the main subject,
the image processing apparatus further comprising:
a photographing mode detection unit configured to detect a photographing mode set at a time of photographing the two-viewpoint images, from collateral information of the two-viewpoint images; and
a selection unit configured to select, in accordance with the detected photographing mode, whether the correction unit corrects the conversion factor of the parallax so that the parallax is more suppressed in a pixel or region having larger difference between parallaxes or corrects the conversion factor of the parallax so that the parallax is more increased in a pixel or region having smaller difference between the parallaxes.

2. The image processing apparatus according to claim 1, further comprising
a holding unit configured to hold target parallax distribution of an entire image and target parallax distribution of the main subject, wherein:
the setting unit sets the conversion factor of the parallax so that parallax distribution of the entire image of the multi-viewpoint images to be generated satisfies the target parallax distribution of the entire image; and
the correction unit corrects the conversion factor of the parallax per pixel, per region, or per image so that parallax distribution of the main subject on the multi-viewpoint images to be generated satisfies the target parallax distribution of the main subject.

3. The image processing apparatus according to claim 1, further comprising:
an output unit configured to output the generated stereoscopically-displayed image at a predetermined size; and
a modification unit configured to modify the target parallax distribution of the entire image and the target parallax distribution of the main subject in accordance with the predetermined size.

4. The image processing apparatus according to claim 1, wherein
the setting unit sets, in a case where the multi-viewpoint images to be generated are four or more, the conversion factor of the parallax so that a difference between viewpoint positions in a central portion is larger than a difference between viewpoint positions at both end portions.

5. The image processing apparatus according to claim 1, wherein:
the correction unit corrects the conversion factor of the parallax per pixel, per region, or per image so that the conversion factor of the parallax of one image of the two-viewpoint images becomes 0; and
the multi-viewpoint image generation unit converts the image whose conversion factor of the parallax is 0, to thereby generate the multi-viewpoint images.

6. The image processing apparatus according to claim 1, wherein
the correction unit corrects the conversion factor of the parallax per pixel, per region, or per image so that the conversion factor of the parallax of an image at a central viewpoint position, of the multi-viewpoint images to be generated, becomes smallest.

7. An image processing apparatus comprising:
an image input unit configured to receive two-viewpoint images having a parallax there between;
a parallax acquisition unit configured to acquire a per-pixel or per-region parallax between the two-viewpoint images;
a main subject detection unit configured to detect a main subject on the two-viewpoint images;
a parallax acquisition unit configured to acquire a parallax of the main subject;
a setting unit configured to set a conversion factor of the parallax in accordance with respective viewpoint positions of multi-viewpoint images to be generated;
a correction unit configured to correct the conversion factor of the parallax per pixel, per region, or per image on a basis of the parallax of the main subject;
a multi-viewpoint image generation unit configured to convert at least one image of the two-viewpoint images in accordance with the corrected conversion factor of the parallax, to thereby generate the multi-viewpoint images;
an image adjustment unit configured to shift the two-viewpoint images or the multi-viewpoint images in a horizontal direction so that the parallax of the main subject on the multi-viewpoint images becomes a parallax appropriate for stereoscopic view;
a stereoscopically-displayed image generation unit configured to generate a stereoscopically-displayed image on a basis of the multi-viewpoint images;
a parallax histogram acquisition unit configured to acquire a histogram of the per-pixel or per-region parallax, wherein
the correction unit corrects the conversion factor of the parallax per pixel or per region so as to make parallax gradations constant in accordance with frequencies in the histogram.

8. The image processing apparatus according to claim 7, wherein
the setting unit sets, in a case where the multi-viewpoint images to be generated are four or more, the conversion factor of the parallax so that a difference between viewpoint positions in a central portion is larger than a difference between viewpoint positions at both end portions.

9. The image processing apparatus according to claim 7, wherein:
the correction unit corrects the conversion factor of the parallax per pixel, per region, or per image so that the conversion factor of the parallax of one image of the two-viewpoint images becomes 0; and
the multi-viewpoint image generation unit converts the image whose conversion factor of the parallax is 0, to thereby generate the multi-viewpoint images.

10. The image processing apparatus according to claim 7, wherein
the correction unit corrects the conversion factor of the parallax per pixel, per region, or per image so that the conversion factor of the parallax of an image at a central viewpoint position, of the multi-viewpoint images to be generated, becomes smallest.

11. An image processing apparatus comprising:
an image input unit configured to receive two-viewpoint images having a parallax there between;
a parallax acquisition unit configured to acquire a per-pixel or per-region parallax between the two-viewpoint images;
a main subject detection unit configured to detect a main subject on the two-viewpoint images;
a parallax acquisition unit configured to acquire a parallax of the main subject;
a setting unit configured to set a conversion factor of the parallax in accordance with respective viewpoint positions of multi-viewpoint images to be generated;
a correction unit configured to correct the conversion factor of the parallax per pixel, per region, or per image on a basis of the parallax of the main subject;
a multi-viewpoint image generation unit configured to convert at least one image of the two-viewpoint images in accordance with the corrected conversion factor of the parallax, to thereby generate the multi-viewpoint images;
an image adjustment unit configured to shift the two-viewpoint images or the multi-viewpoint images in a horizontal direction so that the parallax of the main subject on the multi-viewpoint images becomes a parallax appropriate for stereoscopic view;
a stereoscopically-displayed image generation unit configured to generate a stereoscopically-displayed image on a basis of the multi-viewpoint images;
a photographed scene recognition unit configured to recognize a photographed scene on the two-viewpoint images; and
a main subject setting unit configured to set a main subject region in accordance with the photographed scene, wherein
the correction unit corrects the conversion factor of the parallax per region or per pixel in accordance with a distance on the image from the main subject region.

12. The image processing apparatus according to claim 11, wherein:
the photographed scene recognition unit includes a photographing mode detection unit configured to detect a photographing mode set at a time of photographing the two-viewpoint images, from collateral information of the two-viewpoint images;
the main subject region setting unit sets, in a case where the detected photographing mode is a person mode, a central region of a plurality of regions obtained by vertically dividing the image, as the main subject region; and
the correction unit corrects the conversion factor of the parallax per region or per pixel in accordance with a distance in the horizontal direction from the main subject region.

13. The image processing apparatus according to claim 11, wherein:
the photographed scene recognition unit includes a photographing mode detection unit which detects a photographing mode set at a time of photographing the two-viewpoint images, from collateral information of the two-viewpoint images;
the main subject region setting unit sets, in a case where the detected photographing mode is a scenery mode, a central region of a plurality of regions obtained by horizontally dividing the image, as the main subject region; and
the correction unit corrects the conversion factor of the parallax per region or per pixel in accordance with a distance in the vertical direction from the main subject region.

14. The image processing apparatus according to claim 11, wherein:
the photographed scene recognition unit includes an extraction unit configured to extract a short-distance view region, a middle-distance view region, and a long-distance view region from the two-viewpoint images; and
the correction unit corrects the conversion factor of the parallax per region or per pixel in accordance with the respective extracted regions.

15. The image processing apparatus according to claim 11, wherein
the setting unit sets, in a case where the multi-viewpoint images to be generated are four or more, the conversion factor of the parallax so that a difference between viewpoint positions in a central portion is larger than a difference between viewpoint positions at both end portions.

16. The image processing apparatus according to claim 11, wherein:
the correction unit corrects the conversion factor of the parallax per pixel, per region, or per image so that the conversion factor of the parallax of one image of the two-viewpoint images becomes 0; and
the multi-viewpoint image generation unit converts the image whose conversion factor of the parallax is 0, to thereby generate the multi-viewpoint images.

17. The image processing apparatus according to claim 11, wherein
the correction unit corrects the conversion factor of the parallax per pixel, per region, or per image so that the conversion factor of the parallax of an image at a central viewpoint position, of the multi-viewpoint images to be generated, becomes smallest.

* * * * *